(12) United States Patent
Connellan et al.

(10) Patent No.: US 12,093,438 B2
(45) Date of Patent: Sep. 17, 2024

(54) INPUT DEVICE FOR AR/VR APPLICATIONS

(71) Applicant: Logitech Europe S.A., Lausanne (CH)

(72) Inventors: Andreas Connellan, Dublin (IE);
Arash Salarian, Lausanne (CH);
Fergal Corcoran, County Cork (IE);
Jacques Chassot, Granges-de-Vesin (CH); Jerry Ahern, Ballincollig Cork (IE); Laleh Makarem, Lausanne (CH);
Mario Gutierrez, Lausanne (CH);
Maxim Vlasov, Geneva (CH); Olivier Guédat, Lausanne (CH); Padraig Murphy, County Monogham (IE);
Richard Peter Perring, Lausanne (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 17/216,012

(22) Filed: Mar. 29, 2021

(65) Prior Publication Data
US 2021/0216135 A1    Jul. 15, 2021

Related U.S. Application Data

(63) Continuation of application No. 16/163,346, filed on Oct. 17, 2018, now Pat. No. 10,996,742.
(Continued)

(51) Int. Cl.
*G06F 3/03*    (2006.01)
*G01C 21/16*   (2006.01)
(Continued)

(52) U.S. Cl.
CPC .......... *G06F 3/011* (2013.01); *G01C 21/1652* (2020.08); *G01C 21/1656* (2020.08);
(Continued)

(58) Field of Classification Search
CPC .......... G06F 3/011; G06F 3/0346; G06F 3/03; G01S 5/0294; G01S 5/18; G01S 11/16; G01S 5/16; G01S 5/30; G01C 21/165
See application file for complete search history.

(56) References Cited

U.S. PATENT DOCUMENTS 10,152,141 B1 * 12/2018 Lohse ............... G06F 3/013
2006/0161377 A1 * 7/2006 Rakkola ............. G01P 13/00
702/141

(Continued)

*Primary Examiner* — Lunyi Lao
*Assistant Examiner* — Jarurat Suteerawongsa
(74) *Attorney, Agent, or Firm* — Kilpatrick Townsend & Stockton LLP

(57) ABSTRACT

An AR/VR input device include a processor(s), an internal measurement unit (IMU), and a plurality of sensors configured to detect emissions received from a plurality of remote emitters. The processor(s) can be configured to: determine a time-of-flight (TOF) of the detected emissions, determine a first estimate of a position and orientation of the input device based on the TOF of a subset of the detected emissions and the particular locations of each of the plurality of sensors on the input device that are detecting the detected emissions, determine a second estimate of the position and orientation of the input device based on the measured acceleration and velocity from the IMU, and continuously update a calculated position and orientation of the input device within the AR/VR environment in real-time based on a Beyesian estimation (e.g., Extended Kalman filter) that utilizes the first estimate and second estimate.

8 Claims, 16 Drawing Sheets

Related U.S. Application Data

(60) Provisional application No. 62/573,684, filed on Oct. 17, 2017.

(51) Int. Cl.
*G01S 5/02* (2010.01)
*G01S 5/18* (2006.01)
*G06F 3/01* (2006.01)
*G06F 3/0346* (2013.01)

(52) U.S. Cl.
CPC .............. *G01S 5/0294* (2013.01); *G01S 5/18* (2013.01); *G06F 3/0346* (2013.01)

(56) References Cited

U.S. PATENT DOCUMENTS

| | | | |
|---|---|---|---|
| 2007/0033265 A1* | 2/2007 | Anderson | H04L 67/125 709/217 |
| 2008/0189661 A1* | 8/2008 | Gundlach | G06F 3/017 382/103 |
| 2008/0278445 A1* | 11/2008 | Sweetser | G06F 3/0346 345/158 |
| 2011/0079703 A1* | 4/2011 | Gunning, III | G01S 5/163 73/514.01 |
| 2011/0107270 A1* | 5/2011 | Wang | G16H 20/40 703/11 |
| 2011/0285704 A1* | 11/2011 | Takeda | G06T 15/00 345/419 |
| 2014/0125594 A1* | 5/2014 | Lee | G06F 3/011 345/158 |
| 2015/0309584 A1* | 10/2015 | Kawai | G06F 3/0425 345/158 |
| 2016/0334884 A1* | 11/2016 | Solomon | G06F 3/0386 |
| 2018/0157398 A1* | 6/2018 | Kaehler | G06F 3/017 |
| 2018/0180448 A1* | 6/2018 | Miller | G01B 7/14 |

* cited by examiner

INPUT DEVICE FOR AR/VR APPLICATIONS

CROSS-REFERENCES TO RELATED APPLICATIONS

This application is a continuation of U.S. non-provisional application Ser. No. 16/163,346, filed on Oct. 17, 2018, and titled "INPUT DEVICE FOR AR/VR APPLICATIONS" which claims priority to and is the benefit of U.S. Provisional Application No. 62/573,684, filed on Oct. 17, 2017 and titled "INPUT DEVICE FOR AR/VR APPLICATIONS," the disclosures of which are herein incorporated by references in their entirety for all purposes.

BACKGROUND

Virtual reality (VR) is frequently associated with a variety of applications that comprise immersive, highly visual, computer-simulated environments. These environments typically simulate a physical presence of a user in places in a real or an imagined world. The computer simulation of these environments can include visual images, which are presented by means of a graphical display. Typically, the display is arranged as a head mounted display (HMD) and may encompass all or part of a user's field of view.

Augmented reality (AR) or mixed reality (MR), on the other hand, can superimpose virtual images on a real world environment, or otherwise combine them. A famous example is Google™ Glass, where a display is projected on an HMD worn by a user, while still allowing the user to see the real world. A touchpad on the side of the Google™ Glass HMD provides control of the display. Another technology is retinal projection, where a small projector mounted on an HMD can project a display directly onto a retina of a user's eye, while allowing the user to see the real world at the same time.

In an AR/VR/MR system, a problem is to track (e.g., the 3D position and 3D orientation of) certain entities (e.g., an HMD or a hand controller). It is desirable to be able to track the HMD and hand controllers, in real time, within the same, fixed, inertial frame of reference. This can be done using outside-in or inside-out systems. In outside-in systems, certain emitters (e.g., beacons, light sources, or markers) can be embedded or fixed in an environment at known locations. An entity in the AR/VR/MR system can include sensor(s) that can be used to track the location of the entity with respect to these fixed markers to estimate its own position and/or orientation. A typical example of an outside-in is the HTC Vive™ system.

In inside-out systems, the tracked entities in the AR/VR/MR system are tracked using sensor(s) external to the tracked entities. The sensors(s) can be located at known reference points within an environment and can be used to track points of reference coupled to the entity to be tracked in the environment.

In most virtual systems, the tracked entities are typically composed of two parts: one part is the functional part that, e.g., offers services to the user (such as the display subsystem of the HMD) and a part that is dedicated to the tracking (such as through use of emitters and/or sensors embedded in the HMD to help it localize itself). Despite the many improvements, there remain significant tracking challenges in many systems that can be caused by occlusions, echoes, and other signal disruptions that can negatively impact system performance. As AR/VR systems continue to advance, more robust tracking systems are needed.

SUMMARY

Some embodiments of the invention include an input device configured for interfacing with a virtual reality (VR)/augmented reality (AR) environment, the input device including one or more processors; an internal measurement unit (IMU) controlled by the one or more processors and configured to measure an acceleration and velocity (e.g., linear or angular velocity) of the input device; and a plurality of sensors controlled by the one or more processors and disposed on the input device, each of the plurality of sensors configured to detect emissions received from a plurality of remote emitters (e.g., transducers), and each of the plurality of sensors associated by the one or more processors with a different particular location on the input device. In some implementations, the one or more processors can be configured to: determine a time-of-flight (TOF) of the detected emissions, determine a first estimate of a position and orientation of the input device based on the TOF of a subset of the detected emissions and the particular locations of each of the plurality of sensors on the input device that are detecting the detected emissions, determine a second estimate of the position and orientation of the input device based on the measured acceleration and velocity from the IMU, and continuously update a calculated position and orientation of the input device within the AR/VR environment in real-time based on a Beyesian estimation that utilizes the first estimate and second estimate. In some instances, the emitters are at least one of a set of ultrasonic emitters or a set of optical emitters. The Beyesian estimation may include the use of at least one of a Kalman-type filter (e.g., extended Kalman), a particle filter, or other probabilistic estimation technique, as would be appreciated by one of ordinary skill in the art with the benefit of this disclosure.

In certain embodiments, the detected emissions can be propagated according to one of a time-division-multiplexing (TDM) scheme, frequency-division-multiplexing (FDM) scheme, or a code-division-multiplexing (CDM) scheme. The subset of the detected emissions can correspond to emissions received from less than the total number of remote emitters. For example, in a system with three ultrasonic emitters (also referred to as transmitters or transceivers), one or more sensors on the input device may receive a transmission (e.g., ultrasound signal) from only one or two of the three emitters making a subset of the total number of transitions. This may occur intentionally (e.g., using the first received transmission as soon as it comes, such as in a TDM scheme), unintentionally (e.g., receiving a subset due to occlusions blocking one or more of the line-of-site pathways between the transmitters and sensors (also referred to as receivers) on the input device), or a combination thereof. The AR/VR environment can be defined by a Cartesian coordinate system, polar coordinate system, or any suitable coordinate system for tracking in three dimensional (3D) space. In some cases, the detected emissions can be propagated according to a TDM scheme wherein each consecutively detected emission corresponds to a different transducer of the plurality of emitters, and where each consecutively detected emission detected by one or more of the plurality of sensors is individually used to update the first estimate. In other embodiments, the detected emissions can be propagated according to a CDM scheme where the one or more processors are configured to: determine a first code in the detected emissions having a highest amplitude; process the first code to update the first estimate; subtract the highest amplitude code from the detected emissions; determine a code in the detected emissions having a second highest amplitude; and process the second code to update the first estimate. Alternatively, the one or more processors can be configured to determine amplitudes and/or delays of strongest path for each code, select the strongest corresponding code replica, subtract identically scaled and delayed code, and if additional codes are present, the method is iterated, and if no additional codes are present, the method ends. The input device can be configured to track movement in the AR/VR environment with 6 degrees of freedom (DOF).

In some embodiments, a system for tracking an input device in an AR/VR environment may include one or more processors; and one or more non-transitory computer-readable storage mediums containing instructions configured to cause the one or more processors to perform operations including: receiving movement data from an IMU on the input device; determining a first estimate of a position and orientation of the input device based on the movement data from the IMU; receiving ultrasound data from one or more sensors on the input device, the ultrasound data including ultrasound signals received from a plurality of remote emitters (e.g., transmitters, transducers, etc.); determining a TOF for each of the ultrasound signals from a subset of the plurality of remote transmitters; determining a second estimate of the position and orientation of the input device based on the TOF for each of the ultrasound signals from the subset of the plurality of remote transmitters; and continuously updating a position and orientation vector of the input device within the AR/VR environment based on a Beyesian estimation utilizing the first estimate and second estimate. In some cases, the subset of the plurality of the remote transmitters can be less than a total number of the plurality of the remote transmitters. The second estimate can be further based on a location of the one or more sensors. The Beyesian estimation may include the use of at least one of a Kalman-type filter (e.g., extended Kalman filter), a particle filter, or other comparable probabilistic estimation scheme.

In some embodiments, the ultrasound signals can be propagated according to one of a TDM scheme, FDM scheme, or a CDM scheme. With the CDM scheme, the one or more non-transitory computer-readable storage mediums can further contain instructions configured to cause the one or more processors to perform operations including: determining which of a plurality of codes in the ultrasound data has the highest amplitude; updating the second estimate using the code with the highest amplitude; subtracting the code with the highest amplitude from the ultrasound data; determining which of a remaining plurality of codes in the ultrasound data has the second highest amplitude; updating the second estimate using the code with the second highest amplitude; and subtracting the code with the second highest amplitude from the ultrasound data. Alternatively, the instructions may be configured to cause the processors to determine amplitudes and/or delays of strongest path for each code, select the strongest corresponding code replica, subtract identically scaled and delayed code, and if additional codes are present, the method is iterated, and if no additional codes are present, the method ends. The AR/VR environment can be defined by a Cartesian coordinate system or other suitable coordinate system. The input device may be configured to track movement in the AR/VR environment in 3 DOF, 6 DOF, or other suitable range of motion detection.

In further embodiments, a method for tracking a peripheral device in a VR/AR environment can include: detecting a location of a base device within a first coordinate system; receiving location data from a peripheral device; determining a location of the peripheral device relative to the base device based on the location data, the determined location determined within a second coordinate system; mapping the location of the peripheral device of the second coordinate system into a location within the first coordinate system; and causing the base device to display the peripheral device at its location relative to the base device in the VR/AR environment. In some cases, the location data may be provided by one or more ultrasonic emitters. The peripheral device can be a controller device that tracks movement in 6 degrees of freedom (DOF).

In some embodiments, a method of tracking a peripheral device in a VR/AR environment may include: detecting a location of a base device within a first coordinate system; receiving movement tracking data corresponding to a movement of the peripheral device relative to the base device; determining a current field-of-view within the VR/AR environment; in response to determining that the peripheral device is located within the current field-of-view within the VR/AR environment, setting a movement sensitivity of the peripheral device to a first sensitivity value; and in response to determining that the peripheral device is located outside of the current field-of-view within the VR/AR environment, setting the movement sensitivity of the peripheral device to a second sensitivity value, the second sensitivity value corresponding to a lower movement sensitivity than the first sensitivity value. In such cases, the peripheral device can be a controller device that tracks movement in 6 DOF, 3 DOF, or other suitable range of motion.

BRIEF DESCRIPTION OF THE FIGURES

Aspects, features and advantages of embodiments of the present disclosure will become apparent from the following description of embodiments in reference to the appended drawings.

DETAILED DESCRIPTION

Figure 1:
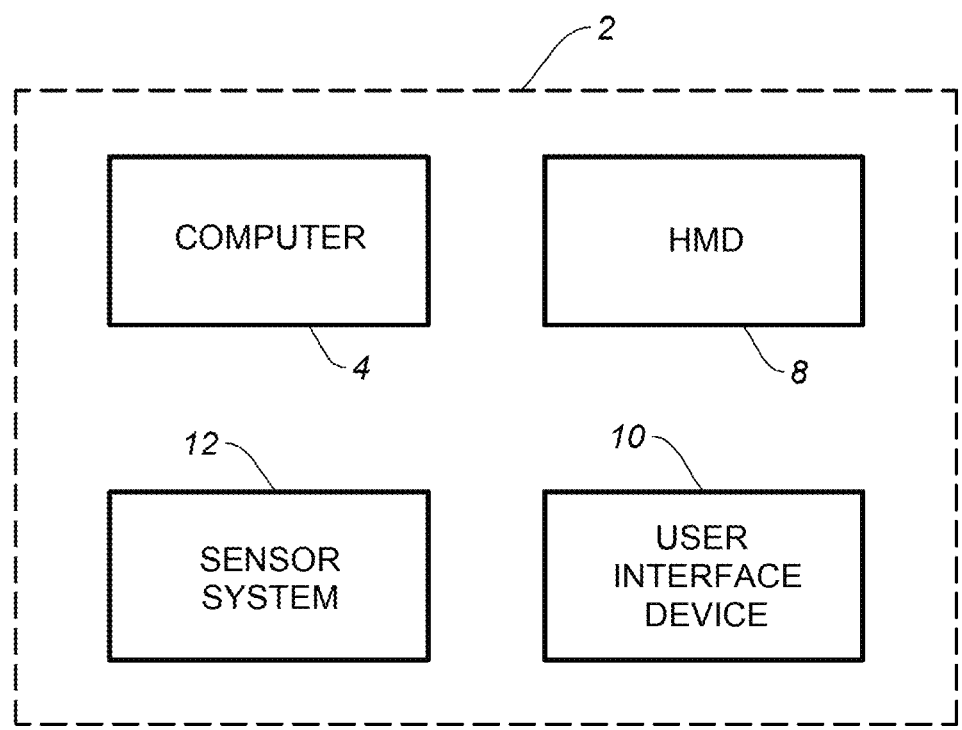
FIG. 1 is a block system diagram showing an embodiment of AR/MR/VR environment system, according to certain embodiments.

The following detailed description refers to the accompanying drawings. The same reference numbers may be used in different drawings to identify the same or similar elements. In the following description, for purposes of explanation and not limitation, specific details are set forth such as particular devices, structures, architectures, interfaces, techniques, etc. in order to provide a thorough understanding of the various aspects of the present disclosure. However, it will be apparent to those skilled in the art having the benefit of the present disclosure that the various aspects of the claims may be practiced in other examples that depart from these specific details. In certain instances, descriptions of well-known devices, circuits, and methods are omitted so as not to obscure the description of the present disclosure with unnecessary detail.

Definitions

The present disclosure may be better understood in view of the following explanations:

As used herein, the terms "computer simulation" and "virtual reality environment" may refer to a virtual reality, augmented reality, real-reality, mixed reality, or other form of visual, immersive computer-simulated environment provided to a user. As used herein, the terms "virtual reality" or "VR" may include a computer-simulated environment that replicates an imaginary setting. A physical presence of a user in this environment may be simulated by enabling the user to interact with the setting and any objects depicted therein. Examples of VR environments may include: a video game; a medical procedure simulation program including a surgical or physiotherapy procedure; an interactive digital mock-up of a designed feature, including a computer aided design; an educational simulation program, including an E-leaning simulation; or other like simulation. The simulated environment may be two or three-dimensional. As used herein, the terms "augmented reality" or "AR" may include the use of rendered images presented in conjunction with a real-world view. Examples of AR environments may include: architectural applications for visualization of buildings in the real-world; medical applications for augmenting additional information to a user during surgery or therapy; gaming environments to provide a user with an augmented simulation of the real-world prior to entering a VR environment. As used herein, the terms "mixed reality" or "MR" may include use of virtual objects that are rendered as images in conjunction with a real-world view of an environment wherein the virtual objects can interact with the real world environment. Embodiments described below can be implemented in AR, VR, or MR.

As used herein, the term "real-world environment" or "real-world" may refer to the physical world. Hence, term "real-world arrangement" with respect to an object (e.g., a body part or user interface device) may refer to an arrangement of the object in the real-world and may be relative to a reference point. The term "arrangement" with respect to an object may refer to a position (location and orientation). Position can be defined in terms of a global or local coordinate system.

As used herein, the term "rendered images" may include images that may be generated by a computer and displayed to a user as part of a virtual reality environment. The images may be displayed in two or three dimensions. Displays disclosed herein can present images of a real-world environment by, for example, enabling the user to directly view the real-world environment and/or present one or more images of a real-world environment (that can be captured by a camera, for example).

As used herein, the term "head mounted display" or "HMD" may refer to a display to render images to a user. The HMD may include a graphical display that is supported in front of part or all of a field of view of a user. The display can include transparent, semi-transparent or non-transparent displays. The HMD may be part of a headset. The graphical display of the HMD may be controlled by a display driver, which may include circuitry as defined herein.

As used herein, the term "electrical circuitry" or "circuitry" may refer to, be part of, or include one or more of the following or other suitable hardware or software components: a processor (shared, dedicated, or group); a memory (shared, dedicated, or group), a combinational logic circuit, a passive electrical component, or an interface. In certain embodiment, the circuitry may include one or more virtual machines that can provide the described functionality. In certain embodiments, the circuitry may include passive components, e.g., combinations of transistors, transformers, resistors, capacitors that may provide the described functionality. In certain embodiments, the circuitry may be implemented using, or functions associated with the circuitry may be implemented using, one or more software or firmware modules. In some embodiments, circuitry may include logic, at least partially operable in hardware. The electrical circuitry may be centralized or distributed, including being distributed on various devices that form part of or are in communication with the system and may include: a networked-based computer, including a remote server; a cloud-based computer, including a server system; or a peripheral device.

As used herein, the term "processor" or "host/local processor" or "processing resource" may refer to one or more units for processing including an application specific integrated circuit (ASIC), central processing unit (CPU), graphics processing unit (GPU), programmable logic device (PLD), microcontroller, field programmable gate array (FPGA), microprocessor, digital signal processor (DSP), or other suitable component. A processor can be configured using machine readable instructions stored on a memory. The processor may be centralized or distributed, including distributed on various devices that form part of or are in communication with the system and may include: a networked-based computer, including a remote server; a cloud-based computer, including a server system; or a peripheral device. The processor may be arranged in one or more of: a peripheral device, which may include a user interface device and/or an HMD; a computer (e.g., a personal computer or like device); or other device in communication with a computer system.

As used herein, the term "computer readable medium/media" may include conventional non-transient memory, for example, random access memory (RAM), an optical media, a hard drive, a flash drive, a memory card, a floppy disk, an optical drive, and/or combinations thereof. It is to be understood that while one or more memories may be located in the same physical location as the system, the one or more memories may be located remotely from the host system, and may communicate with the one or more processor via a computer network. Additionally, when more than one memory is used, a first memory may be located in the same physical location as the host system and additional memories may be located in a remote physical location from the host system. The physical location(s) of the one or more memories may be varied. Additionally, one or more memories may be implemented as a "cloud memory" (i.e., one or more memory may be partially or completely based on or accessed using the network).

As used herein, the term "communication resources" may refer to hardware and/or firmware for electronic information transfer. Wireless communication resources may include hardware to transmit and receive signals by radio, and may include various protocol implementations e.g. 802.11 standards described in the Institute of Electronics Engineers (IEEE) and Bluetooth™ signal line, said modulation may accord to a serial protocol such as, for example, a Universal Serial Bus (USB) protocol, serial peripheral interface (SPI), inter-integrated circuit (I2C), RS-232, RS-485, or other protocol implementations.

As used herein, the term "network" or "computer network" may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, and/or another type of suitable network.

As used herein, the term "sensor system" may refer to a system operable to provide position information concerning input devices, peripherals, and other objects in a physical world that may include a body part or other object. The term "tracking system" may refer to detecting movement of such objects. The body part may include an arm, leg, torso, or subset thereof including a hand or digit (finger or thumb). The body part may include the head of a user. The sensor system may provide position information from which a direction of gaze and/or field of view of a user can be determined. The object may include a peripheral device interacting with the system. The sensor system may provide a real-time stream of position information. In an embodiment, an image stream can be provided, which may represent an avatar of a user. The sensor system and/or tracking system may include one or more of a: camera system; a magnetic field based system; capacitive sensors; radar; acoustic; other suitable sensor configuration, optical, radio, magnetic, and inertial technologies, such as lighthouses, ultrasonic, IR/LEDs, SLAM tracking, light detection and ranging (LIDAR) tracking, ultra-wideband tracking, and other suitable technologies as understood to one skilled in the art. The sensor system may be arranged on one or more of: a peripheral device, which may include a user interface device, the HMD; a computer (e.g., a P.C., system controller or like device); other device in communication with the system.

As used herein, the term "camera system" may refer to a system comprising a single instance or a plurality of cameras. The camera may comprise one or more of: a 2D camera; a 3D camera; an infrared (IR) camera; a time of flight (ToF) camera. The camera may include a complementary metal-oxide-semiconductor (CMOS), a charge-coupled device (CCD) image sensor, or any other form of optical sensor in use to form images. The camera may include an IR filter, which can be used for object tracking. The camera may include a red-green-blue (RGB) camera, which may be used for generation of real-world images for augmented or mixed reality simulations. In an embodiment different frames of a single camera may be processed in an alternating manner, e.g., with an IR filter and for RGB, instead of separate cameras. Images of more than one camera may be stitched together to give a field of view equivalent to that of the user. A camera system may be arranged on any component of the system. In an embodiment the camera system is arranged on a headset or HMD, wherein a capture area of the camera system may record a field of view of a user. Additional cameras may be arranged elsewhere to track other parts of a body of a user. Use of additional camera(s) to cover areas outside the immediate field of view of the user may provide the benefit of allowing pre-rendering (or earlier initiation of other calculations) involved with the augmented or virtual reality rendition of those areas, or body parts contained therein, which may increase perceived performance (e.g., a more immediate response) to a user when in the virtual reality simulation. This can be an important aspect to ensure safe and pleasant use of VR. The camera system may provide information, which may include an image stream, to an application program, which may derive the position and orientation therefrom. The application program may implement known techniques for object tracking, such as feature extraction and identification. Examples include the speed-up robust features (SURF) algorithm. An example of a camera presently available is the Pro C920 or C930 Full HD by Logitech.

As used herein, the term "user interface device" may include various devices to interface a user with a computer, examples of which include: pointing devices including those based on motion of a physical device, such as a mouse, trackball, joystick, keyboard, gamepad, steering wheel, paddle, yoke (control column for an aircraft) a directional pad, throttle quadrant, pedals, light gun, or button; pointing devices based on touching or being in proximity to a surface, such as a stylus, touchpad or touch screen; or a 3D motion controller. The user interface device may include one or more input elements. In certain embodiments, the user interface device may include devices intended to be worn by the user. Worn may refer to the user interface device supported by the user by means other than grasping of the hands.

As used herein, the term "input element" or "user interface" may refer to an object that the user interacts with to provide user input to a computer system. The input element or user interface may include a user manipulatable object, examples of which include: steering wheel; stick; pedal; mouse; keys; buttons; control pad; scroll wheel; flight yoke; light pen or other stylus device; glove, watch or other wearable device; rotational elements such as a dial or knob, motion detector; touch sensitive device. The user input element may be adapted to provide an input in other manners, including by the determination of a movement of a body part, including a touch pad.

As used herein, the term "totem" may, for example, include one or more physical or virtual objects which are manipulatable by the user to allow input or interaction with the AR, MR, or VR system. The totem may be used as a user interface device or a controller or as an object in virtual space. Some totems may take the form of inanimate objects, for example a piece of metal or plastic, a wall, a surface of table. Alternatively, some totems may take the form of animate objects, for example a hand of the user. The totems may not actually have any physical input structures (e.g., keys, triggers, joystick, trackball, rocker switch). Instead, the totem may simply provide a physical surface, and the AR, MR or VR system may render a user interface so as to appear to a user to be on one or more surfaces of the totem. For example, the AR, MR or VR system may render an image of a computer keyboard or trackpad to appear to reside on one or more surfaces of a totem. For instance, the AR system may render a virtual computer keyboard and virtual trackpad to appear on a surface of a thin rectangular plate of aluminum which serves as a totem. The rectangular plate may not itself have any physical keys or trackpad.

As used herein, the term "lighthouse" may, for example, include a sensor for a tracking system to track real objects such as a totem, user input device, or any other object. A lighthouse can be incorporated into a sensor system, tracking system, or camera system as described above.

The lighthouse may include, for example, IR LEDs, a spinning laser, or other moving light(s) or other detectable light source(s).

As used herein, the term "IMU" refers to an Inertial Measurement Unit which may measure acceleration and/or angular velocity and/or magnetic field along the x, y, z coordinates.

As used herein, the term "keyboard" may refer to an alphanumeric keyboard, emoji keyboard, graphics menu, or any other collection of characters, symbols or graphic elements. A keyboard can be a real world mechanical keyboard, or a touchpad keyboard such as a smart phone or tablet On Screen Keyboard (OSK). Alternately, the keyboard can be a virtual keyboard displayed in an AR/MR/VR environment.

As used herein, the term "fusion" may refer to combining different position and orientation-determination techniques and/or position and orientation-determination techniques using different coordinate systems to, for example, provide a more accurate position and orientation determination of an object. For example, data from an IMU and a camera tracking system, both tracking movement of the same object, can be fused. A fusion module as describe herein performs the fusion function using a fusion algorithm. The fusion module may also perform other functions, such as combining location or motion vectors from two different coordinate systems or measurement points to give an overall vector.

As used herein, the numbering of elements is consistent from figure to figure, so that the same element is shown in different figures.

Overview of AR/MR/VR system

Referring to FIG. 1, illustrated is an AR/MR/VR system 2 includes a computer 4, which is capable of providing an AR/MR/VR environment to a user. The system 2 includes a display, which in certain embodiments is an HMD 8. For an AR or MR system, the HMD 8 may be include transparent elements and/or a video projection system or any other AR/MR display technology. The computer 4 provides instructions for display of the AR/MR/VR environment via HMD 8. The system 2 includes a user interface device 10 to interface the user with the computer 4. The user interface device 10 can receive an input from the user for user control of the VR/AR/MR environment. The system 2 includes a sensor and tracking system 12 to provide location and orientation information to the computer, e.g., of a body part of a user, which can include a user head orientation and hand orientation or of another object which may include a peripheral device or other object as will be discussed.

Figure 2:
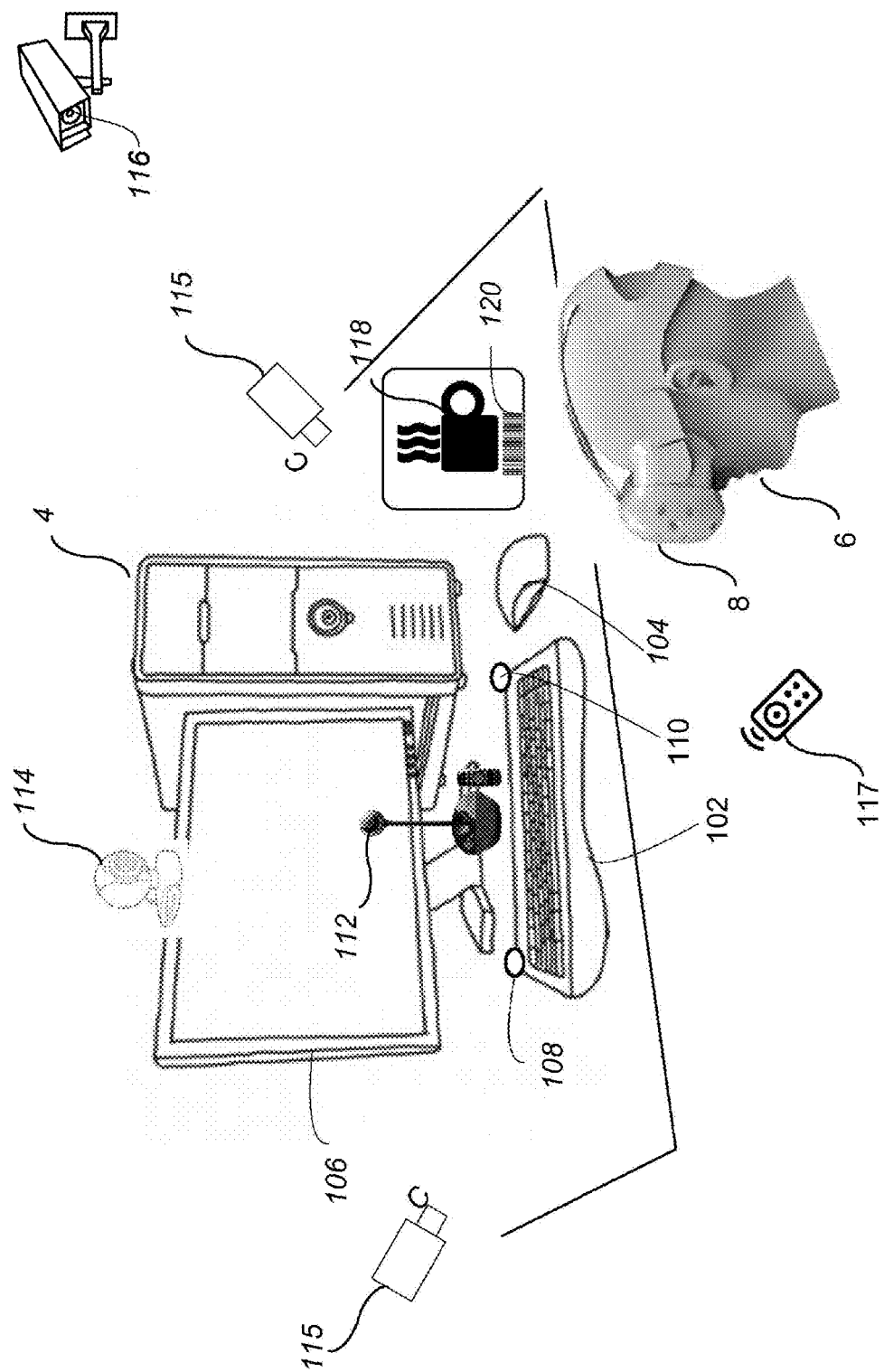
FIG. 2 illustrates a virtual reality system with a sensor and tracking system, according to certain embodiments.

FIG. 2 illustrates a particular embodiment of an AR/MR/VR system with a sensor and tracking system. A user 6 is wearing HMD 8. Two peripherals or input devices are shown—a keyboard 102 and a mouse 104. The location and movement of the hands of user 6 are monitored with one or more cameras or other sensors. Shown in FIG. 2 are cameras 108 and 110 on keyboard 102, a video conference camera 112, a webcam 114 and a security camera 116. Cameras can also be mounted on HMD/glasses 8, elsewhere on the user 6, on a drone, or anywhere else with a view of the physical environment. Each camera can be a stereo camera, with two side-by-side image sensors to provide a 3D image with depth. Images from multiple camera angles can be combined.

In certain embodiments, at least a pair of lighthouses 115 are provided to track a position of HMD 8 and an AR/MR/VR controller 117 using sensing technology other than video images (e.g., ultrasonic). In one example, as provided in Valve's™ Lighthouse tracking technology, the lighthouses provide non-visible light, such as infrared (IR). The lighthouses can have a number of stationary IR LEDs and spinning laser emitters. For example, many times a second, the LEDs can flash, then one of the spinning lasers sweeps a beam of light across the room. HMD 8 and an AR/MR/VR controller 117 can each have a receiver module with an array of photosensors that detect the flashes and the laser beams. Upon detecting a flash, the receiver module can start counting until it detects which one of its photosensors detects a laser beam. The relationship between where that photosensor is located on HMD 8 and an AR/MR/VR controller 117, and when the beam hit the photosensor (from the count), can be used to mathematically calculate its exact position relative to the lighthouses. If photosensors detect the laser, the orientation of the MD 8 or AR/MR/VR controller 117 can be determined, to calculate not only the absolute location in the room, but the direction the HMD 8 or AR/MR/VR controller 117 is facing. In some embodiments, determining the orientation of the HMD 8 or the AR/MR/VR controller 117 can include combining IMU positioning data from the AR/MR/VR controller 117 with data received from photo (or other) sensors. Other combinations of data as well as technologies (e.g., ultrasonic—as further discussed below) are envisioned, as would be understood by one skilled in the art.

Alternately, or in addition, one or more of the cameras or other sensors can detect objects in the physical environment, and can identify those objects through a variety of methods as described in more detail below. For example, a coffee cup 118 may be detected from a barcode 120, an RFID tag, or other identifier. For an RFID tag, instead of, or in addition to, using a camera, an RFID reader could be used. Alternately, a program in computer 4 can instruct the keyboard 102 or mouse 104 to flash an indicator light so it can be identified. The cameras or other sensors can detect which peripheral or object the user's hands are near or touching, and the movement of the user's hands with respect to that object.

A space near or on any of the objects (e.g., peripherals, displays, etc.) can be designated as a gesture space. For example, the airspace above the keyboard can be used for hand gestures which provide control signals. Multiple gesture spaces can be defined. For example, a gesture near the mouse 104 may have a different meaning, or use different gestures, than gestures over the keyboard 102 or on the display 106. More description is provided below.

The image of the object or peripheral can be imported into the virtual reality environment as it actually is, as if the HMD/glasses was partially transparent to allow the user to see the physical objects. Alternately, the real image can be augmented or otherwise changed, or moved. For example, the types of keys shown on a keyboard representation could be changed from alphanumeric to emojis. An input that isn't present can be projected onto the object in the virtual reality environment, such as a keypad on top of mouse 104 or even on coffee cup 118.

Figure 3:
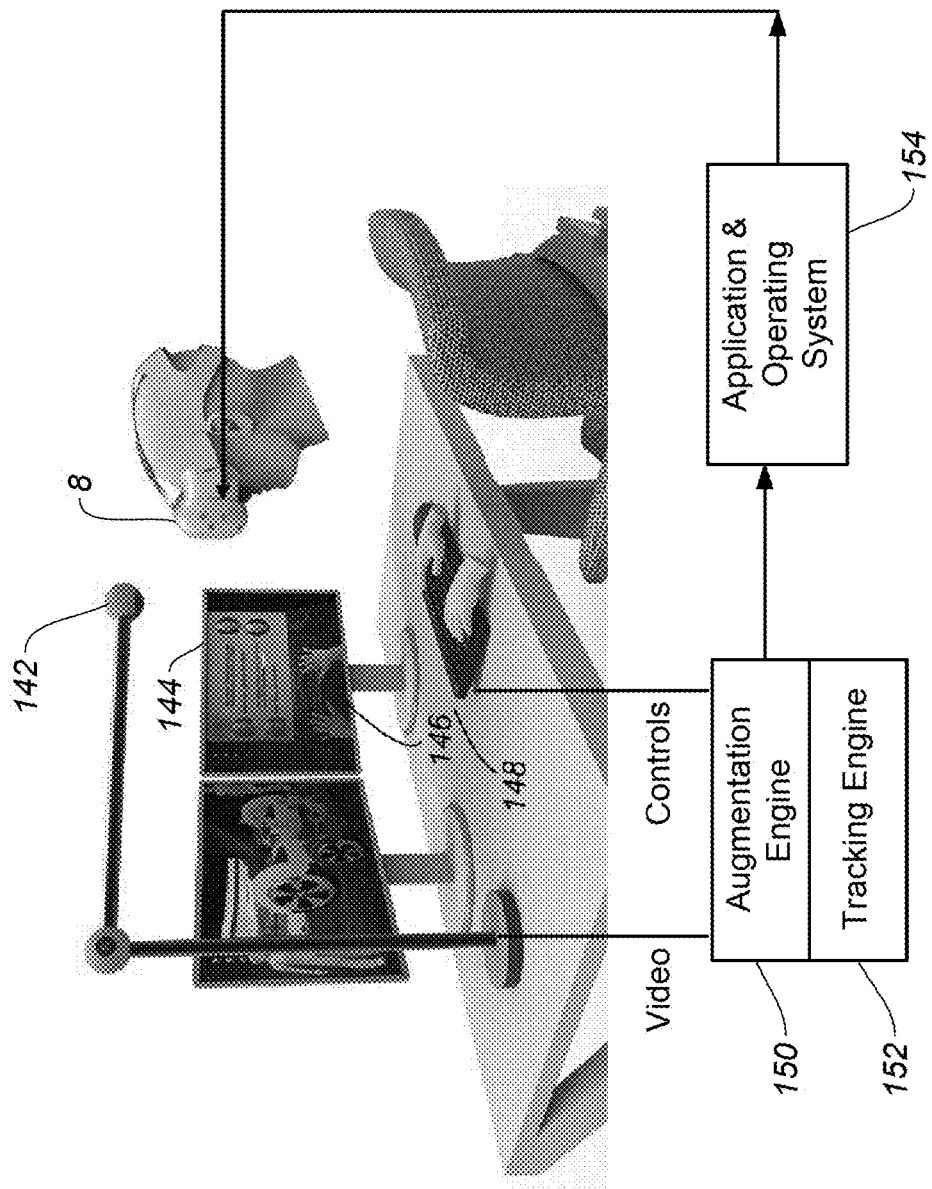
FIG. 3 is a high level diagram of an augmentation and tracking system operation, according to certain embodiments.

FIG. 3 is a high level diagram of an embodiment including operation of an augmentation and tracking system for use with AR/MR/VR system(s). Camera 142 can provide video to an augmentation engine 150 and tracking engine 152. Video from other cameras, and/or other sensing data from other sensors can be provided. The video and other sensing data can be used for several purposes. In some embodiments, the video and/or sensor data can be used to provide a realistic display of one or more peripherals and the user's hands in the virtual reality environment. In other embodiments, the video and/or sensor data can be used to track the user movements with respect to the peripherals.

Separately, control inputs from keyboard 148 can be provided to augmentation engine 148 and tracking engine 152. The determination of which key is depressed, or about to be depressed, can be detected by several methods, such as by an actual key press which generates a key signal, a proximity sensor on the key, and/or from the camera 142 or other sensors. The control signals can be provided to "press" the appropriate key in the virtual reality environment, as well as determine which key should be augmented. The video and control signals, as augmented and modified, can be provided to application and operating system software 154 for the HMD 8. Hooks/IME can be provided to integrate with virtual reality applications and desktop displays that are injected into the virtual reality environment.

In some embodiments, a representation 146 of the keyboard and user's hands is displayed on a physical monitor 144, and then the display of the physical monitor is imported into the HMD 8. Alternately, representation 146 can be generated in the HMD, providing more flexibility on positioning, such as under a desired one of multiple virtual monitors in the virtual reality environment.

Network and Computer Elements

Figure 4:
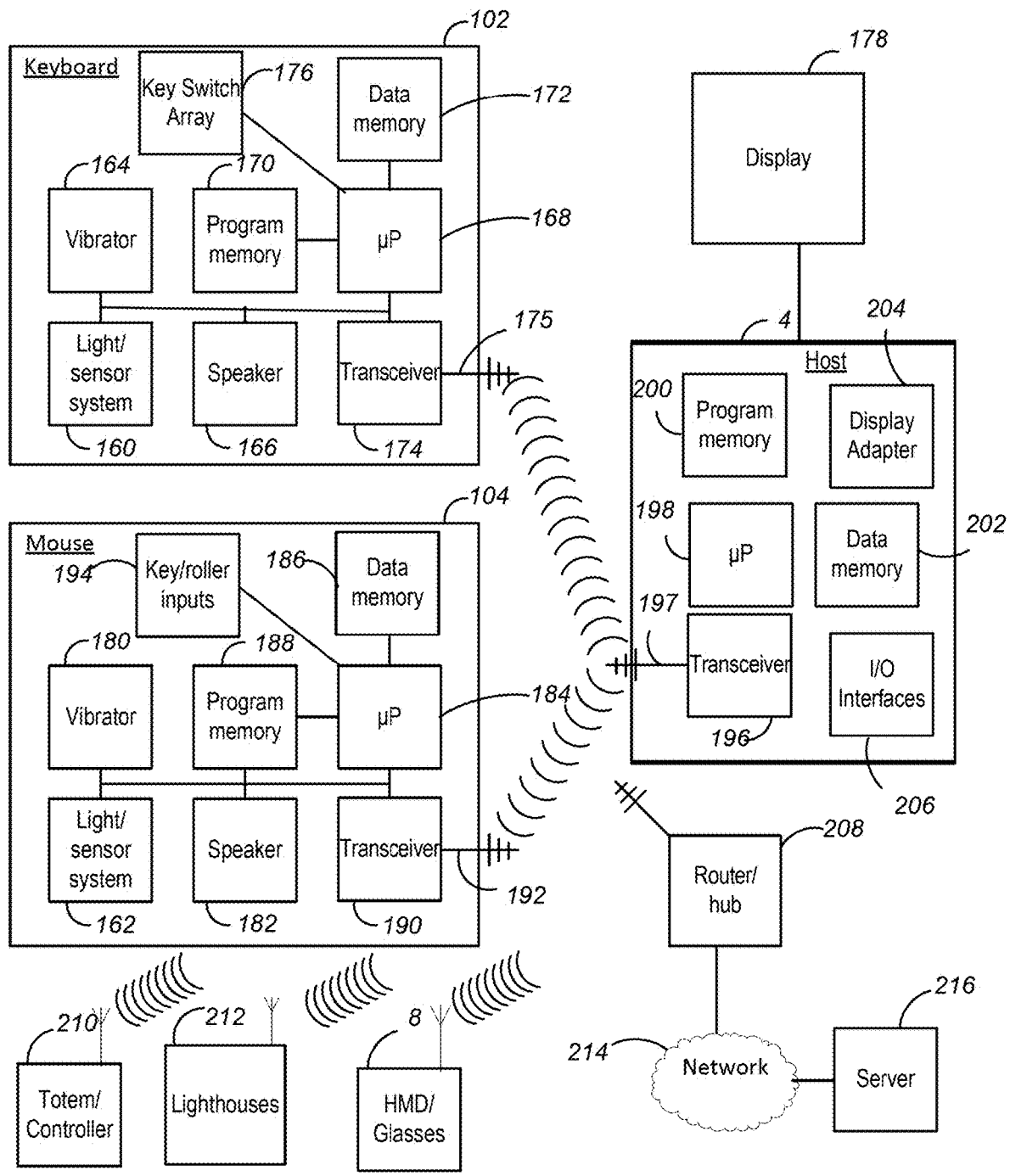
FIG. 4 is a block diagram of the electronics components in user interface devices and other elements of an AR/MR/VR environment, according to certain embodiments.

FIG. 4 is a block diagram showing an embodiment of a AR/MR/VR system 2 of FIG. 1. A keyboard 102, mouse 104 and personal computer 4 are shown. Keyboard 102 has a lighting/sensor system 160, and mouse 104 has a lighting/sensor system 162. The sensor system can include cameras or other sensors as described above. The sensors, such as IR photodetectors, can detect signals from lighthouses in certain embodiments. The lighting system can light up aspects of the keyboard or mouse to allow them to be identified by other cameras or other sensors. The lights can be visible or infrared, or alternately other identification technologies could be used, such as ultrasound. Additional user interface devices or peripherals with their own lighting/sensor systems can be added. For example, a game pad or game controller, a headset, a joystick, touchpad, steering wheel, or any other computer or gaming input device. Alternately, non-user interface peripheral devices and be provided with the lighting/sensor systems, such as a mouse pad, a stand, or the frame or display of the host itself.

Keyboard 102 can also have a haptic feedback device such as a vibrator 164 and a speaker 166 for providing haptic and sound effects. A controller or microprocessor 168 controls the various systems using a program in program memory 170 and data in a data memory 172. In one embodiment, program memory 170 can be partially in firmware or ROM. A transceiver 174 and antenna 175 allows the wireless downloading of programs, communication with other devices and communication with computer 4. Bluetooth, RF, or any other wireless communication technology may be used. A key switch array 176 detects key activations and provides the key data to microprocessor 168, which can then provide the key data as inputs to HMD/glasses 8 or a display 178.

Mouse 104 can similarly have a vibrator 180 and speaker 182. It also has a controller 184, data memory 186, program memory 188, transceiver 190 and antenna 192. The transceiver and antenna also allows the wireless downloading of programs, communication with other devices and communication with computer 4. A key/roller inputs 194 detects key and roller activations and provides the input/control data to microprocessor 184, which can then provide the key and control data as inputs to HMD/glasses 8 or a display 178.

Computer 4 includes transceiver 196, antenna 197, microprocessor 198, program memory 200, data memory 202, display adaptor 204, and I/O interfaces 206. Alternately, a router or hub 208 could be used to interconnect the various devices that provide the communication link. In addition, the router hub, or other device could function as the host, as well as providing the communication link.

Computer 4 can provide display signals to either HMD 8 or a desktop or other display 178. Inputs can also be provided from a totem/controller 210, which can have electronic components similar to keyboard 102 and mouse 104. Lighthouses 212 can be used to detect the location of totem/controller 210, keyboard 102 and mouse 104. The lighthouses can include cameras for image recognition, sensors for detecting or emitting visible or IR light from/to the various devices, ultrasonic sensors, or any other type of sensing system.

A remote server 216 can be accessed over a network 214 to provide some or all of the needed processing, or to provide content and controls, such as in a multi-player game environment. Server 216 may provide some or all of the video content or other data or controls to the computer 4. Network 214 can be the Internet, a Wide Area Network (WAN), a Local Area Network (LAN) or any other network or networks or communication path. Alternately, the computer 4 may generate and/or control the virtual reality environment from locally stored instructions. In one embodiment the computer 4 includes a program memory 200 with instructions executable for generation of the VR/AR/MR environment. The number of servers 216 and networks 214 can be modified as appropriate for a particular implementation, such as where content is provided from multiple content servers, or computers of other users in a shared video game. The transceiver 196 of computer 4 may connect to the network 214 through router/hub 214 and/or via wired and/or wireless connections, and thereby communicate or become coupled with server 216, either directly or indirectly. Alternatively, transceiver 196 may be associated with server 216 through any suitable tangible computer-readable media or data storage device, data stream, file, or communication channel.

Computer 4 includes memory such as program memory 200 implemented as read-only memory (ROM) or writable memory. Data memory 202 may include a random-access memory (RAM) or another type of dynamic storage device that stores information and instructions for execution by microprocessor 198. The ROM may include a conventional ROM device or another type of static storage device that stores static information and instructions for use by microprocessor 198. The computer 4 includes input/output (I/O) interfaces 206 to interface the computer 4 with peripheral and input devices, including the HMD 8, keyboard 102, mouse 104 and totem/controller 210. Device drivers (not shown) may communicate with the peripheral devices through electronic circuitry of the I/O interfaces 206. The I/O interfaces 206 may use display 178 in addition to the HMD 8, which may display images of the virtual reality environment application, operating system application or other images associated with the AR/MR/VR environment. The display may allow configuration of system 2 by the user without needing to wear the HMD 8, or configuration of system 2 by any other person, or to allow a secondary non-VR display of the AR/MR/VR environment, e.g., for observational, run-time configurational, safety or any other purpose. The I/O interface 206 may include an audio output device (not shown) such as a speaker, which is preferably coupled to microprocessor 198 via associated audio circuitry such as, but not limited to amplifiers, filters, and other circuitry known to the skilled person to provide sound output to the user when an audio event occurs during the implementation of an application program. In embodiments the audio output device and associated circuitry may be located on the HMD 8.

The computer 4 may perform operations based on instructions that may be read into the program memory 200 from a computer-readable medium or from another device via communication resources. The instructions contained in the program memory 200 cause microprocessor 198 to perform processes that will be described later. Alternatively, hard-wired circuitry may be used in place of or in combination with instructions to implement said processes. Thus, various implementations are not limited to any specific combination of hardware circuitry and software.

The computer 4 may implement instructions for determining from an image stream provided by the camera system the arrangement of objects in the capture area. For object tracking the instructions may implement known techniques, such as feature extraction and identification. Examples include the speed-up robust features (SURF) algorithm.

Example implementations of the computer 4 include: a personal computer (PC); workstation; laptop; a home video game console system, which is typically connected to a television set or other display; a set-top box, which can be used, for example, to provide interactive television functions to users; or a network or internet-computer; a media player (such as an MP3 player); a subnotebook/netbook; a tablet computer; a smartphone; a cellular telephone; a personal digital assistant (PDA); other similar electronic device; other suitable device. In some cases, computer 4 may be incorporated as part of the HMD 8 and/or user interface device such as keyboard 102 or mouse 104. The computer 4 may be operable under various operating systems including the Windows™, MacOS™, UNIX™, or MS-DOS™ operating system.

The user interface device microprocessors 168 and 184 may be provided with instructions to wait for commands or requests from the computer 4, decode the command or request, and handle/control input and output signals according to the command or request. In addition, the microprocessors may read sensor signals and calculate appropriate forces from those sensor signals, time signals, and stored or relayed instructions selected in accordance with a host command.

The keyboard 102, mouse 104 and any other user interface device includes an I/O system such as key switch array 176, key/roller inputs 194, or any other I/O input device to provide information to/from the microprocessors. The I/O system may vary depending on the configuration of the user interface device. In embodiments the I/O system may be incorporated, connected to, or in communication with the sensor system. Said input elements may include an associated sensor system coupled to the I/O system, which may include one or more of the following: optical sensor systems; optical encoders, potentiometers; velocity sensors; acceleration sensors; strain gauge; resistive sensors; capacitive (e.g. touch) sensors, or any other type of sensors. A sensor driver may be implemented to convert sensor signals to signals that can be interpreted by the microprocessors.

The user interface devices such as keyboard 102 and mouse 104 are coupled to the computer 4 by communication resources, an example of which includes a bi-directional bus such as an RS232 serial interface, RS-422, RS-485, 12C, Universal Serial Bus (USB), MIDI, Firewire or other protocols known to the skilled person or a parallel bus or wireless link, such as BTIe or proprietary 2.4 kHz protocol for instance. In embodiments the communication resources supply power from the computer 4 to the user interface. In embodiments, a dedicated power supply is implemented.

Tracking Controllers, Totems and Objects

In certain embodiments, the position of the controller can be tracked relative to the position of an HMD. AR/VR/MR systems, especially using an HMD, can be user centric wherein the user (or an HMD to be worn by a user) can be used as an origin of a coordinate system. Positions of objects can be described in the coordinate system in relation to the user for rendering on the HMD. A controller, as described herein, can be tracked in the same coordinate system or may include its own tracking features that may, for example, be in relation to one or more sensors. The one or more sensors can be mounted on the HMD, for example. The controller's position can be tracked using a controller coordinate reference system that may be different from the AR/VR/MR system coordinate system. The controller coordinate reference system can be nested within the HMD coordinate reference system to provide the location of the controller within the HMD coordinate reference system.

As disclosed herein, position of the controller can be determined using several tracking techniques. For example, ultrasound or other systems can be used wherein corresponding emitters can be physically mounted to a controller and an HMD. Time of flight of ultrasonic emissions transmitted between the emitters can be measured to determine position of the controller. However, in order to determine the relative position of the controller to the HMD, the position of the HMD may need to be determined. Because the HMD may be tracked using a different coordinate system (and using different techniques) than the controller, it may be difficult to determine the relative position of the controller to the HMD, especially as the HMD is moved by a user of an AR/VR/MR system.

For example, the position of the HMD may be determined using a first coordinate system using a first technique. There may be delays in determining a location of the HMD that may be internal and unknown to the controller tracking system/technique. Additionally, determining a position of the HMD may have accuracy tolerances that may be unknown to the controller tracking system. In certain embodiments, tolerances or latencies may be known to the controller tracking system. In either instance, these latencies or tolerances may affect accuracies of determining a position of a controller using the controller's tracking system because they effect the location determination of the transducer(s) and/or microphones mounted to the HMD used as a reference for determining a location of the controller.

In certain embodiments, to help account for these latencies or tolerances, an IMU may be mounted to the HMD that may be used by the controller tracking system. The IMU may be in addition to an IMU or other sensors used by the HMD tracking system. In certain embodiments, techniques can be used to estimate a future position of the HMD using historic tracking patterns or other information. In certain embodiments, a calibration procedure, such as passing the HMD through known locations/orientations in relation to a controller, for example, can be used to determine latencies/accuracy issues between the two tracking systems. In certain embodiments, an object to be tracked by the HMD tracking system can be provided by the controller tracking system. For example, the controller itself can present itself to the HMD tracking system, such as by providing a blinking LED for example. Delays in determining a position or reporting the blinking LED can be accessed by the controller system and, by comparing to a known blinking pattern of the LED, a delay can be assessed. This information can be used to estimate delay(s) of the HMD tracking system and accounted for by the controller tracking system.

After these delays or tolerances are accounted for, the coordinate system of the controller tracking system can be nested (e.g., fused) into the HMD tracking system. The nesting can translate properties (e.g., originals, scales, units, etc.) of the controller tracking system to corresponding properties of the HMD tracking system.

In certain embodiments, it can be assumed that the entities within the AR/VR/MR system can communicate with each other so the state or information of the sensor of different entities are shared or at least available on demand to other entities within the system. The tracked entities can be localized and results sent to a central processor, e.g. to the computer that runs the AR/VR/MR environment. The intelligence or the processing element that does this computation could be centralized (e.g., in the host computer, or in the HMD) or it could be distributed between the tracked entities.

Figure 5:
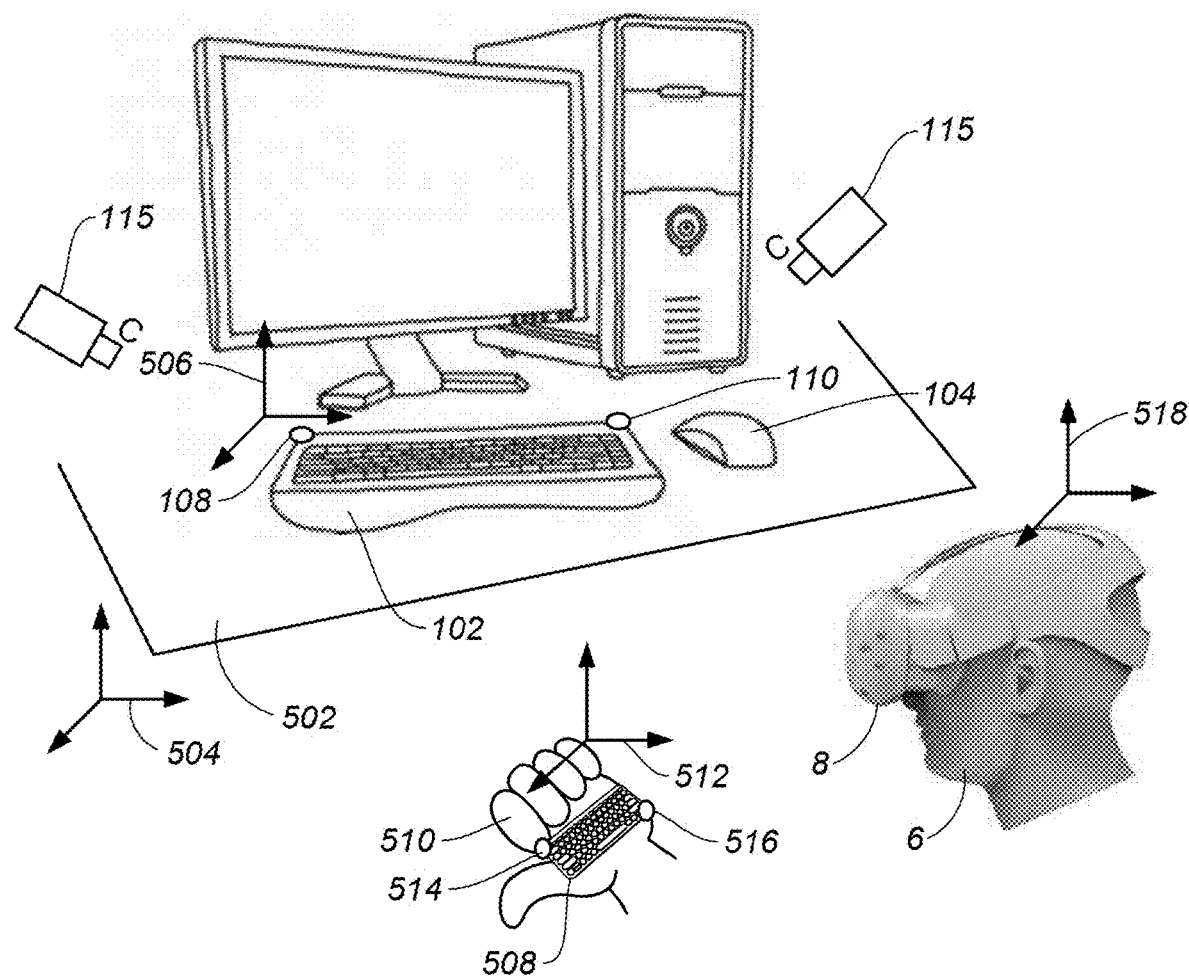
FIG. 5 is a diagram illustrating the nesting of controller and HMD coordinate systems, according to certain embodiments.

FIG. 5 is a diagram illustrating the nesting of controller and HMD coordinate reference systems, according to certain embodiments. The real world in which user 6, desk 502 and keyboard 102 are located is represented by a real world coordinate reference system 504. The view of the world from keyboard 102 is represented by a keyboard (controller) coordinate reference system 506 for sensor 108 (e.g., camera or ultrasonic sensor). The origin, or zero point of the keyboard coordinate reference system for the x, y and z axes is at sensor 108, or a particular point on sensor 108. Alternately, an origin elsewhere on keyboard 102, or proximate keyboard 102, may be used, with a known distance and direction between sensor 108 and the origin of the coordinate reference system. A similar or the same keyboard coordinate reference system may be referenced with respect to sensor 110. In one embodiment, both sensors 108 and 110 reference the same origin of the keyboard coordinate reference system, located between the sensors, with each sensor have a different offset vector from the origin.

In certain embodiments, a hand-held controller 504 in a user's hand 510 has a coordinate reference system 512. Hand-held controller 504 similarly can have multiple sensors 514, 516 referencing the same or different coordinate reference systems. In one embodiment, hand-held controller 508 and keyboard 102 and potentially other controllers, such as a mouse 104, each have their own coordinate reference system. Alternately, only one of the controllers, or a subset, has sensors for establishing its own controller coordinate reference system, and the other controllers or other devices or objects are tracked relative to that/those controller coordinate reference system(s).

In certain embodiments, an HMD 8 on a user 6 has its HMD coordinate reference system 518. In certain embodiments, HMD 8 uses cameras to provide a visual image for AR or MR. HMD need not track the controllers, because handheld controller 508 or keyboard 102 tracks its position with respect to HMD 8. The relative position in controller coordinate reference system 512 or 506 is then transmitted to HMD 8, or a computer accessible by HMD 8. The relative positions is combined as an offset in the HMD coordinate reference system 518 to locate the controller relative to HMD 8. If HMD 8 is in a tracked environment, it may also relate the position in HMD coordinate reference system 518 to a real world position in real world coordinate reference system 504. In one embodiment, HMD coordinate system 518 is real world coordinate reference system 504.

In certain embodiments, tracking of particular devices or objects can shift between sensors on keyboard 102, sensors on hand-held controller 508, or sensors on other controllers, totems or objects when one of the sensors is more occluded than the other. Alternately, tracking responsibility may switch between controllers as one controller finds its view occluded. Alternately, the switching of tracking control may be only for a portion of the environment for which the view is occluded.

In certain embodiments, controller 508 can be tracked by fixed lighthouses 115. Controller may have photosensors which detect IR light from the lighthouses 115 to determine its position. The position information can then be provided to HMD 8. If user 6 moves out of the range of lighthouses 115, position tracking of controller 508 can switch to using sensors 514, 518 and coordinate reference system 512 as described above.

In certain embodiments, multiple tracking technologies can be used. HMD 8 uses a first tracking technology (e.g., visual via cameras), and the controller 508 uses a second tracking technology (e.g., ultrasonic or electromagnetic). Controller 508 may use multiple tracking systems, and switch between systems when one tracking system is occluded or otherwise disfavored over another tracking technique. Controller 508 may have multiple sensors at different locations on the controller, and switch between them when one is occluded. The default tracking system can be the one that requires the least power or processing time. For example, a camera based tracking system and an ultrasound based tracking system may be used, with the camera based system being the default. As used herein, references to controller 508 may also refer to keyboard 102, mouse 104, or any other controller, totem or object.

In certain embodiments, switching between sensors can be done based on other conditions than occlusion. For example, one sensor may be experiencing more noise, such as reflections off a nearby object.

In certain embodiments, a lower accuracy position is tracked during fast movements, with higher accuracy tracking during slow movements. This saves processing power without denigrating the user experience, since users do not see fast motion as well, and thus do not perceive the lower accuracy tracking. In other embodiments, partial position information can be provided by the controller 508 to the HMD 8, such as position of controller 508 but not orientation, or only 2 DOF. This allows controller 508 to supplement tracking information where the HMD is occluded, and/or simply reduce the processing required in the HMD.

In certain embodiments, HMD 8 may track the position of controller 508, such as by using cameras mounted on HMD 8. The view of the cameras can become occluded, such as by the controller 508 being hidden by hand 508 or the user's other hand or arm, by controller 508 being held under desk 502, by controller 508 being held at the side of user 6 outside the FOV of HMD 8, by the user turning her/his head away from controller 508, etc. In such situations, tracking of the position and orientation of controller 508 relative to HMD 8 can switch to controller 508 and its sensors 514, 516. Control can switch back when the occlusion is removed. Alternately, in case of occlusions, the system does not switch from sensors located in the controllers to sensors located in the HMD. Instead, the system will switch from a set of sensors located in the controller (e.g., ultrasound) to another set of sensors (e.g., IMU) also located in the controller.

In certain embodiments, hand-held controller 508 only includes an internal IMU for measuring 3 DOF, and does not have sensors 514, 516. The tracking of hand-held controller 508 can then be done by keyboard 102, another controller, or lighthouses 115 when in the illustrated environment of FIG. 5. When user 6 leaves the illustrated environment, controller 508 provides functions compatible with 3 DOF, such as rotating virtual objects in an AR/MR/VR environment. Alternately, controller 508 may have a 6 DOF IMU (or a 6DOF SLAM system can be implemented based on cameras mounted in the controller). Controller 508 may be tracked by cameras in HMD 8 when out of range of keyboard 102 and lighthouses 115. Keyboard 102 could be replaced by another controller, totem or object for tracking controller 508 in the environment of FIG. 5.

Time Synchronization

Translating positions between coordinate systems can take into account time scale or measurement differences between the coordinate systems. The multiple controllers can each have a clock. Each measurement for determining a position of a controller can correspond to a timestamp. If the clocks are sufficiently synchronized, measurements between controllers (or an HMD, for example) can be matched based on timestamps to aid in determining positions of controllers or other tracked objects within a common coordinate system. If the timestamps do not sufficiently match, one of the measurements can be interpolated to find a measurement with a matching time. The interpolation can be based on the motion vector and differences in time of other measurements. In one embodiment, local clocks can be synchronized by different means such as timestamps, dedicated events (IR flash) or special coding. In one embodiment, an alternative to synchronized clocks is to use a form of synchronization based on trigger pulses sent between different entities. The trigger pulse could be based on IR or radio frequency.

Calibration

Depending on the technology, calibration may be needed. For ultrasound, sound waves propagate at different speeds depending on environmental conditions, such as air pressure, temperature, or a condition of a transducer. In certain embodiments, an automatic calibration routine can be run using a known distance, for example, between transducer(s). In one example, the user is instructed to hold the controller at arm's length for an initial calibration, then when the system is used in another environment, the user is prompted to hold at arm's length for another calibration. As another example, a controller may be calibrated by positioning the controller a known orientation/distance from an HMD (or other device that may include a transducer). Alternately, the controller can include transmitters/emitters and sensors. The distance between the transmitters/emitters and sensors on the controller can be a fixed, known amount, and can be used for calibration. In another embodiment, the distance can be determined from the camera imaging system, which may not affected in the same way by temperature and pressure.

Calibration can also be used to detect and later cancel noise effects in the environment, such as echoes. Interfering ultrasonic waves can exist within an environment including an ultrasonically tracked controller or other object. By moving the controller around during calibration, interfering ultrasound can be characterized and compensated for. Interfering ultrasound can be emitted by another nearby controller of another user, for example. In one embodiment, the two controllers can communicate with each other for the purposes of detecting and compensating for interfering ultrasonic signals. Alternately, each controller can transmit a unique tag or ID in ultrasound, which other controllers can recognize as not being the desired signal, and can perform appropriate compensation. In one embodiment, controllers can be synchronized by means of an RF or optical link to make sure that they do not transmit ultrasound waves at the same time.

In certain embodiments, a plurality of emitters (e.g., transducers) can be used as an emitter and one or more corresponding can be used as a sensor to detect ultrasound for the emitter(s). For example, three different transducers can be used as emitters and arranged at predetermined locations and/or relative locations to one another. Each emitter can emit ultrasound at a different frequency and/or at different times. When ultrasound is detected from each of three or more emitters, the times of flight can be determined and used to determine a location of the receiving ultrasound transducer. Alternatively or additionally, multiple emitters can be used as receiving sensors and, by determining a difference of arrival time across the receiving emitters, position information of the controller can be determined. For example, cartesian or other coordinates in three dimensions can be determined for the controller. In certain embodiments, an orientation of the controller can be determined using timing information of ultrasound waves and/or differences in position determinations.

In certain embodiments, ultrasound tracking may be lost due to occlusion, noise or otherwise. When the occlusion or other interference is removed, the tracked controller, totem or object may need to be reacquired. Using the switching of sensors, as described above, another sensor can provide current position information for the purpose of reacquisition. Alternately, the last motion vector can be used with the elapsed time since the last tracked position to estimate a new target position for reacquisition. Alternatively, fusion can used to provide a smooth transition from one sensor set to another.

In certain embodiments, the power (e.g., amplitude and/or intensity) of emitted ultrasound, electromagnetic, or other tracking signal can be varied based on various factors. For example, if the tracked object is determined to be close or, or is moving towards, an HMD or lighthouse, less power may be required for accurate tracking. If the tracked object moves farther away, power may be increased to ensure accurate tracking. Power may also be dynamically adjust to, for example, overcome interference, prevent echoes, overcome occlusions, etc. Emission power can dynamically be modified based on various environmental or other factors in order to optimize power usage versus a signal to noise ratio.

In certain embodiments, the ultrasound/electromagnetic system can be self-adaptive by evaluating the operating conditions and adapting its signal strength, modulation, etc. to the run-time environment. Alternately, the tracking system(s) can be tuned/adapted externally by a fusion algorithm taking into account more specific system level operating conditions such as motion vector, estimated trajectory, possible hands occlusion, which are otherwise not available at the sensor/component level (e.g., the ultrasound tracker may not know about the motion vector of the tracked object itself).

Figure 6:
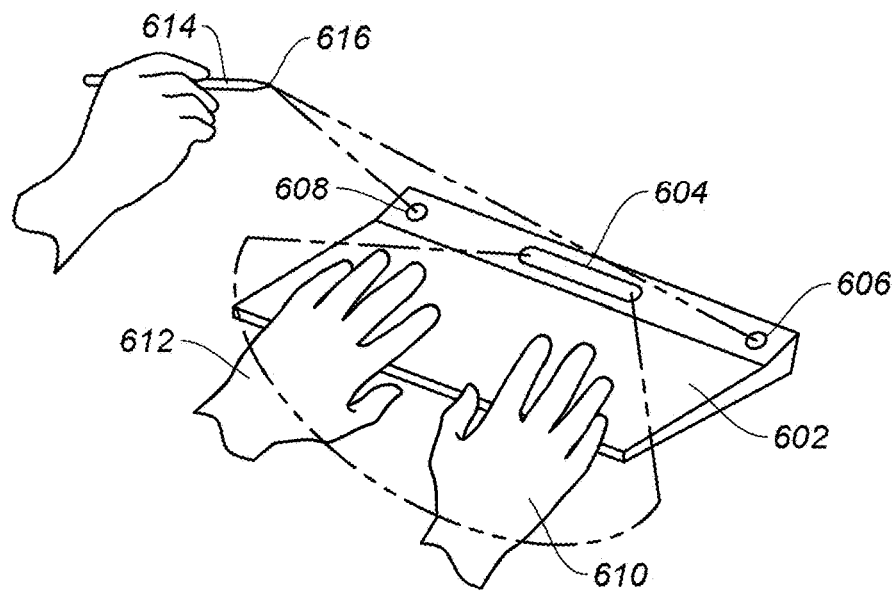
FIG. 6 is a diagram illustrating the tracking of a keyboard and pen controller, according to certain embodiments.

FIG. 6 is a diagram illustrating the tracking of a keyboard and pen controller, according to certain embodiments. A keyboard 602 includes a tracking camera 604 and ultrasonic sensors 606 and 608. Camera 604 can be used to track the positions of hands 610 and 612, and may additionally track the position of pen controller 614. Ultrasonic sensors 606 and 608 can track the position of an ultrasonic emitter 616 at the tip of pen 614. For certain applications, only the tip of pen 614 needs to be tracked. For other applications, the position of the rest of the pen may be tracked with camera 604, with an additional ultrasonic emitter in pen 614, or by tracking the position of one of hands 610, 612 that is holding pen 614 and inferring an estimated position of the pen. An advantage of tracking using keyboard 602, rather than HMD 8, is that keyboard 602 is usually stationary, while HMD 8 is usually moving. Thus, position determination calculations using keyboard 602 may be simpler as compared to position determinations using HMD 8. Electromagnetic, visual, or other tracking techniques can be used instead of or in addition to ultrasonic tracking.

In certain embodiments, because pen tip position emitter is tracked in 3D it can include at least 3 ultrasonic sensors. If the transducer 616 can't be placed on the pen tip, then at least 2 transducers located on the pen embodiment can be used to track the pen tip. For example, the pen tip position can be inferred based on a determined position of the pen body.

In certain embodiments, pen 614 may have a 6 DOF IMU. The IMU output may be combined with the tracked position of ultrasonic emitter 616 to determine an overall position of pen 614. In one embodiment, ultrasonic emitters are provided on keyboard 602 and ultrasonic detectors on pen 614 (or vice versa). A transmitter on pen 614 can transmit the ultrasonic detection information, as well as the IMU data, to a processor in keyboard 602 or directly to a computer or HMD. Controller 508 or any other controller, totem or object can be substituted for pen 614, or for keyboard 602.

In certain embodiments, corresponding pairs of emitting and receiving transducers can be located on the controller and an HMD (or elsewhere in an environment). In certain embodiments, a single transducer can operate in an emitting and receiving mode. Depending on environmental conditions, positions, power usage requirements, or other factors, various sets of emitting or receiving (or corresponding modes) of transducers can be selected to determine a position of the controller. Various combinations of uses are possible depending on the overall setup of controllers, pen, HMD, etc.

Figure 7:
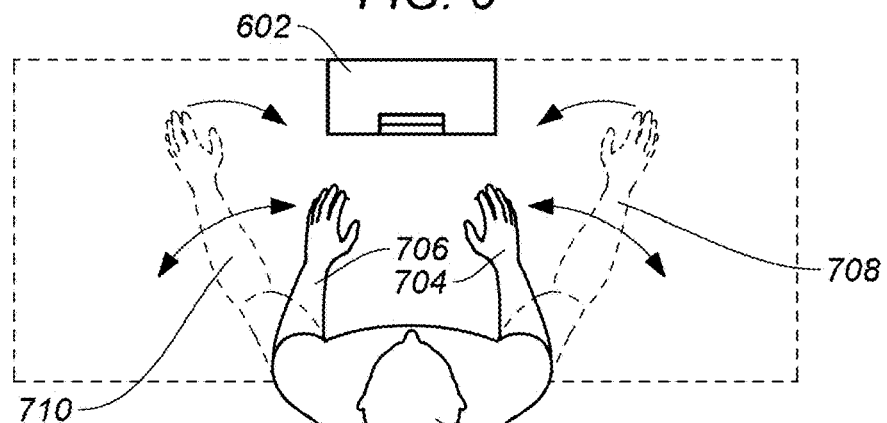
FIG. 7 is a diagram illustrating an interactive tracking envelop, according to certain embodiments.

FIG. 7 is a diagram illustrating an interactive tracking envelope, according to an embodiment. A user 6 can grasp pen 614, controller 508, or another controller, totem, or object to be tracked. The user's arm positions can vary from close-in positions 704, 706 to spread out positions 708, 710. These positions can define an envelope, or area, that can be covered by a camera or other sensors for position determination of a tracked controller grasped by user 6.

Figure 8:
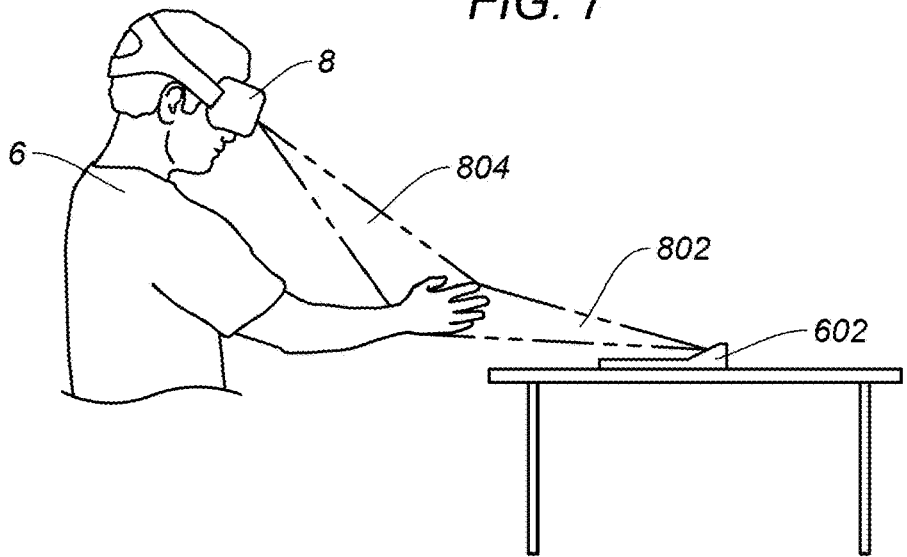
FIG. 8 is a diagram illustrating the different perspectives of a keyboard and HMD, according to certain embodiments.

FIG. 8 is a diagram illustrating the different perspectives of a keyboard and HMD according to an embodiment. As can be seen, keyboard 602 has a view of the hands of user 6 from a perspective 802, while HMD 8 has a view from perspective 804. The keyboard perspective 802, when combined with HMD perspective 804, provides better tracking of the position of the user's hands.

Fusion Module

Figure 9:
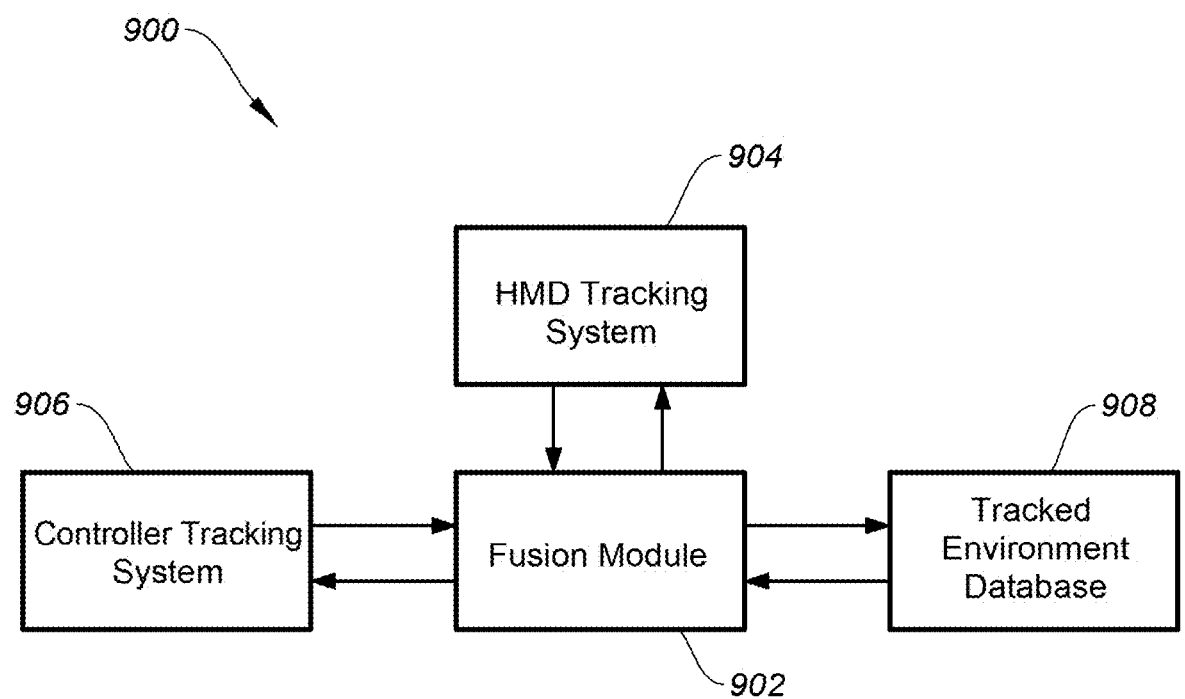
FIG. 9 is a diagram illustrating a fusion module for combining controller and HMD tracking systems, according to certain embodiments.

FIG. 9 is a diagram illustrating a fusion module 902 for combining controller and HMD tracking systems, according to certain embodiments. Fusion module 902 receives coordinate inputs from HMD tracking system 904 and controller tracking system 906. The nested coordinates of controller tracking system 906 can be added to the coordinates of HMD tracking system 904 to yield an actual location and orientation a controller within the HMD tracking coordinate system. The combined data can be stored in tracked environment database 908 for display or directly sent to the display.

As disclosed herein, the HMD can be tracked using a first coordinate system/tracking technique(s) and the controller tracked in relation to the HMD using a second coordinate system/tracking technique(s). A fusion module can be used to translate measurements between coordinate systems/tracking techniques and to account for latency or accuracy issues as disclosed herein. In certain embodiments, a relative motion or position vector from the controller coordinate system can be added to a vector from the HMD coordinate system to provide an absolute location of a controller. One or both vectors may be adjusted so that both have a similar scale and precision. When there is motion, the detected positions can be modified based on an intelligent algorithm to smooth out erroneous variations due to known or unknown latencies or accuracy differences, for example.

As disclosed here, various techniques and/or locations can be used to track a single controller (e.g., the controller can emit or receive ultrasound, EM signal(s), a vision system or IMU system can be used) to obtain position information for the controller or relative location or orientation information between controllers or objects. This information can be fused to achieve better tracking performance. In certain embodiments, a confidence bound or probability can be assigned to each measurement of a distance or orientation based on a signal to noise ratio, local maximum/minimum, envelope detection, or using other techniques. The fusion can combine this information in an intelligent manner to determine the most probable estimation of a position and/or orientation. Thus, multiple tracking measurements can be combined to improve an accuracy or latency of a position determination of a controller that may be unobtainable using a single tracking technique.

In one embodiment, a fusion algorithm can re-purpose or re-configure the currently used sensor suite in the event of a LOS (line-of-sight) occlusion or other interference. Hence, by having a superset of sensors (a full sensor suite) the currently active subset of sensors can be dynamically selected based on the quality of the measurements during run-time. This way, the accuracy of a position determination can be significantly improved. Also, the tracking system (ultrasound) can stay longer on-line providing the tracking data to the fusion algorithm. In certain embodiments, some tracking techniques can dynamically be used to track some degree(s) of freedom of a controller whereas another tracking techniques can be used to determine other degree(s) of freedom.

In certain embodiments, communications can be two-way between an HMD and a controller. For example, fusion module 902 may indicate which tracking system should activate and take over when the other is occluded. Fusion module 902 may be located in HMD 8, a controller, or a computer or server in communication with HMD 8 or the controller. Fusion module 902 may be implemented using the processor and program memory of such devices, or a separate processor and memory.

Figure 10:
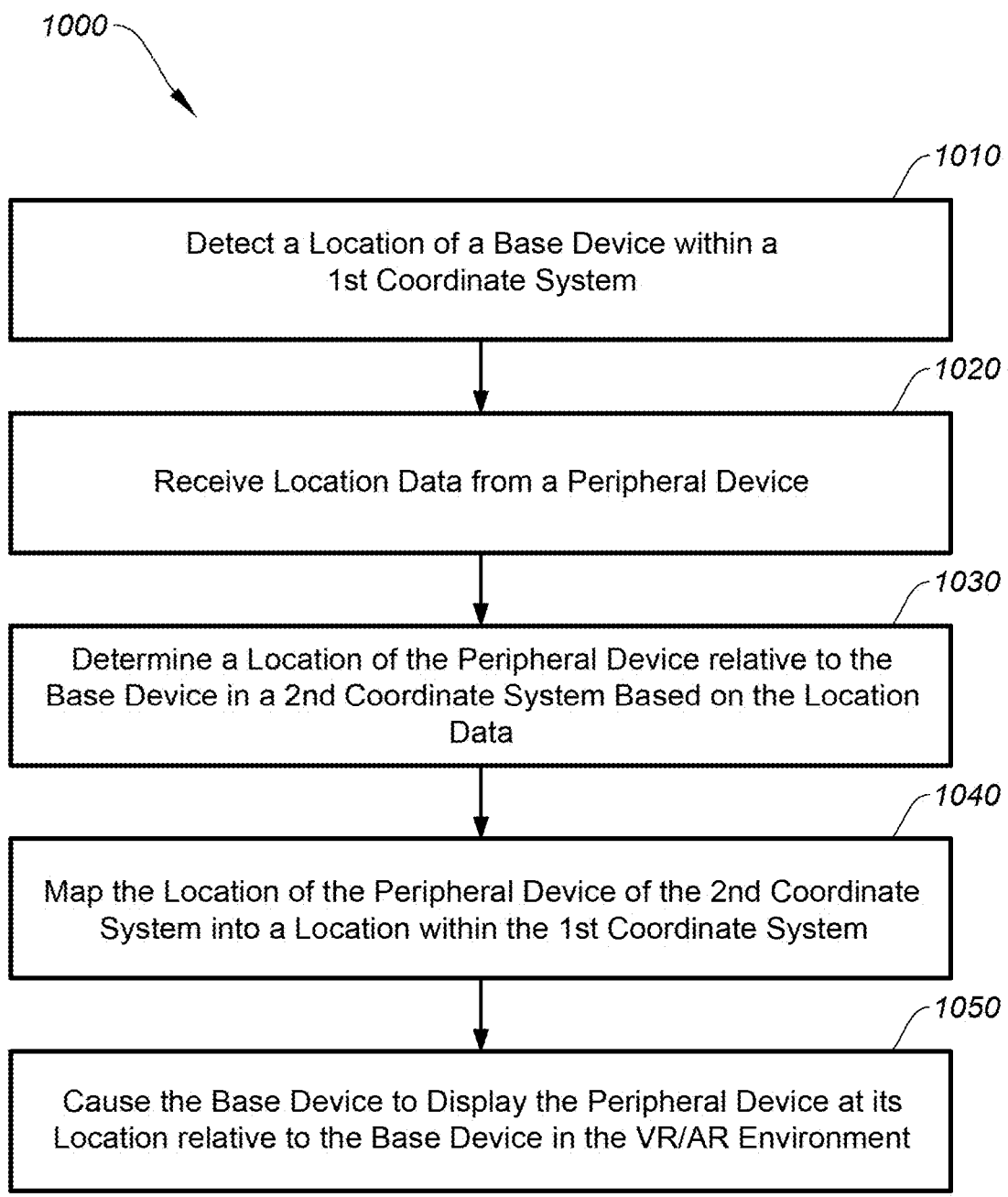
FIG. 10 is a simplified flow chart showing aspects of a method for tracking a peripheral device in a VR/AR environment, according to certain embodiments.

FIG. 10 is a simplified flow chart showing aspects of a method 1000 for tracking a peripheral device in a VR/AR environment, according to certain embodiments. Method 1000 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1000 can be performed by fusion module 902 of system 900.

At operation 1010, method 1000 can include detecting a location of a base device within a first coordinate system, according to certain embodiments. In some cases, the base device can be HMD 8.

At operation 1020, method 1000 can include receiving location data from a peripheral device, according to certain embodiments. In some cases, the location data can be provided by one or more ultrasonic transducers, optical transducers, laser emitters, IR emitters, or the like. In some cases, the peripheral device may be a controller device (e.g., remote control, joystick, presenter device, wearable device (e.g., smart watch), or the like) that tracks movement in 3D space (e.g., 3DOF, 6DOF, etc.).

At operation 1030, method 1000 can include determining a location of the peripheral device relative to the base device based on the location data within a second coordinate system, according to certain embodiments. The first and second coordinate system can be Cartesian coordinate systems, polar coordinate systems, cylindrical or spherical coordinate systems, or other coordinate-based systems, as would be appreciated by one of ordinary skill in the art with the benefit of this disclosure.

At operation 1040, method 1000 can include mapping the location of the peripheral device of the second coordinate system into a location within the first coordinate system, according to certain embodiments. That is, a tracked location of the peripheral device in the second coordinate system can be ported into the first coordinate system, such that the peripheral device is still reported to be in the same location or vector in 3D space, but presented in the same coordinate system (first coordinate system) instead of in two different coordinate systems (the base device (HMD) in the first coordinate system and the peripheral device in the second coordinate system.

At operation 1040, method 1000 can include causing the base device to display the peripheral device at its location relative to the base device in the VR/AR environment, according to certain embodiments. For example, the peripheral device may be rendered on the display of a VR-based HMD where its tracked vector (e.g., position, orientation) can be seen by a user in a fully rendered display showing a virtual peripheral device sharing the same perceived space in the rendered 3D environment.

It should be appreciated that the specific operations illustrated in FIG. 10 provide a particular method 1000 for tracking a peripheral device in a VR/AR environment according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Hand Vibrations

Figure 11B:
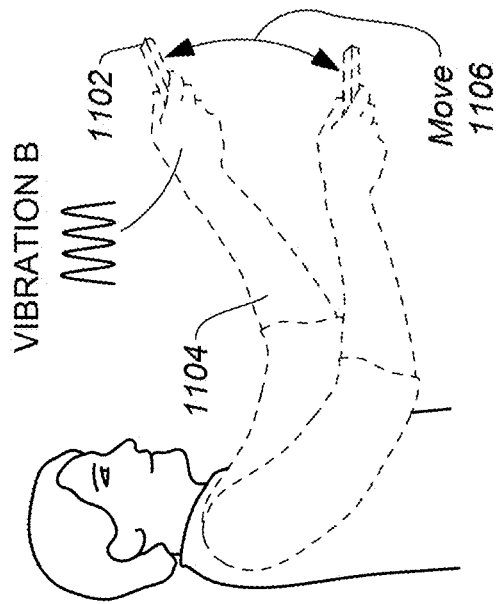
FIGS. 11A-B are diagrams illustrating a method for compensating for IMU drift according to certain embodiments.
Figure 11A:
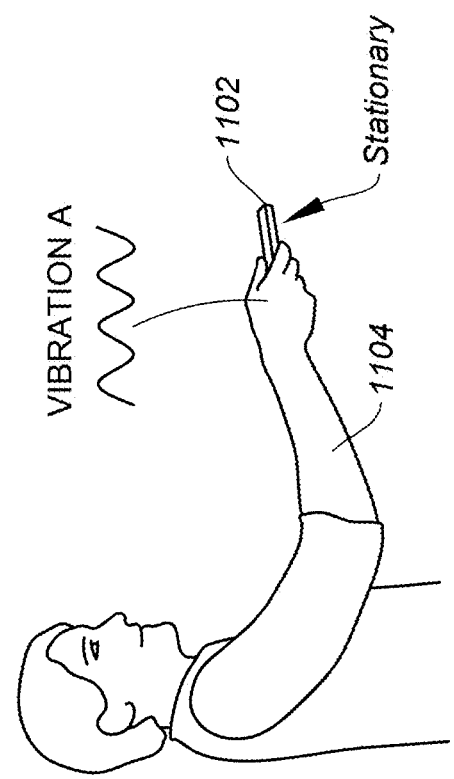

FIGS. 11A-B are diagrams illustrating a method for compensating for IMU drift according to certain embodiments. An IMU can drift due to noise introduced into a tracking sensor. It has been demonstrated that certain people may have small vibrations of their hands which can be unique, similar to fingerprints. The vibrations can change depending on whether the hand is in a static position or moving. In one embodiment, as illustrated in FIG. 11A, a user's hand 1104 is stationary. The vibration of a controller 1102 while the user's hand 1104 is stationary is measured. When the user's hand is moving as shown in FIG. 11B, this can be determined from the IMU. If no motion exists, the vibration measurement can be used to remove the drift of the IMU. This method uses inherent data from the hand, via the hand-held controller 1102, to identify motion.

Controller Electronics

Figure 12:
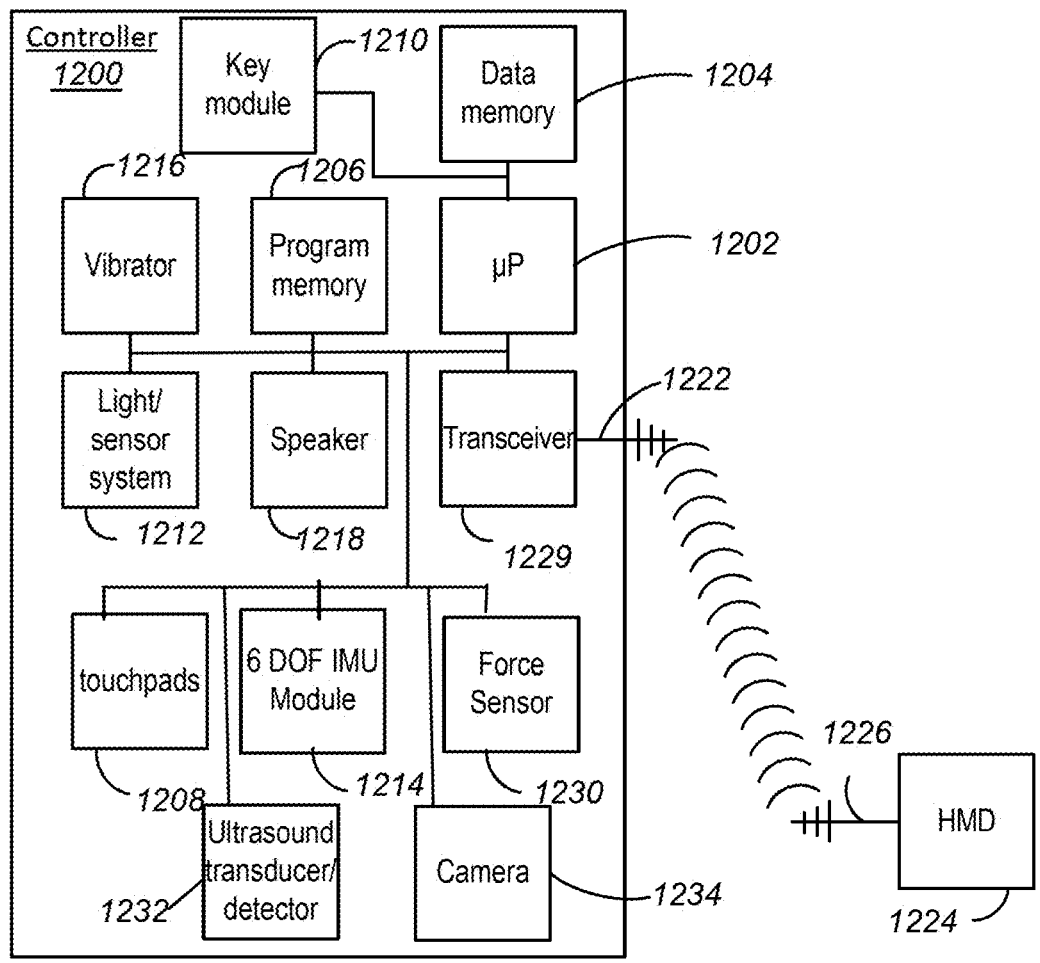
FIG. 12 is a block diagram of the electronics of a handheld controller, according to certain embodiments.

FIG. 12 is a block diagram of the electronics of a handheld controller 1200, according to certain embodiments. FIG. 12 can also represent the components of a keyboard or other controller. A controller or microprocessor 1202 controls the various systems using a program in program memory 1204 and data in a data memory 1204. In one embodiment, program memory 1204 can be partially in firmware or ROM. Touchpads module 1208 detects inputs on the touchpads or other movement inputs, and key module 1210 detects the various key presses.

Light/sensor system 1212 includes photodetectors and electronics for detecting IR light from lighthouses, for example. It may also include light emitters for allowing its detection by a camera system as described above. The movements of controller 1200 are detected by a 6 DOF IMU module 1214. Alternately, a 3 DOF module may be used for a simpler, less expensive controller.

An ultrasound transducer and/or detector module 1232 is provided for tracking objects. A camera module 1234 is also provided for tracking objects. Alternately, depending on the type of controller, only one or the other of modules 1232 and 1234 are provided. Alternately, and electromagnetic or other technology may be used for module 1232.

Controller 1200 also has a haptic feedback device such as a vibrator 1216 and a speaker 1218 for providing haptic and sound effects. A transceiver 1229 and antenna 1222 allows the wireless downloading of programs, communication with other devices and communication with HMD 1224 or a computer (such as by using Bluetooth or another protocol). HMD 1224 has an antenna 1226 for receiving the wireless signals.

IMU and Tracking Fusion

Figure 13:
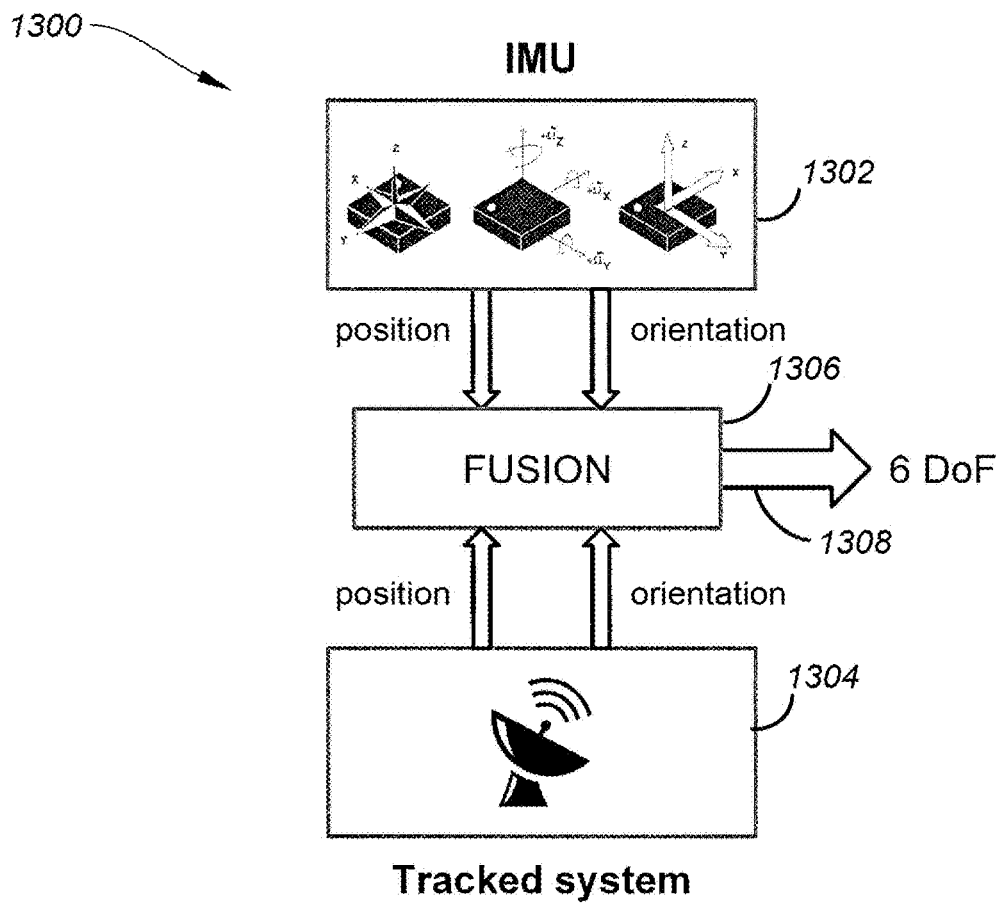
FIG. 13 is a diagram illustrating a system incorporating a fusion module for combining IMU and tracking system data, according to certain embodiments.

FIG. 13 is a diagram illustrating a system 1300 incorporating a fusion module for combining IMU and tracking system data, according to certain embodiments. As illustrated, orientation and/or position information from IMU 1302 is combined with position and/or orientation information from an external position tracking system 1304 in a fusion module 1306 to produce 6 DOF data 1308. IMU 1302 provides position and orientation at high report rate and is less susceptible to occlusions. Tracked system 1304 provides absolute position and orientation to cancel IMU drift. A fusion algorithm may extract the best of both systems.

Embodiments Fusing Multiple Tracking Systems

Figure 14:
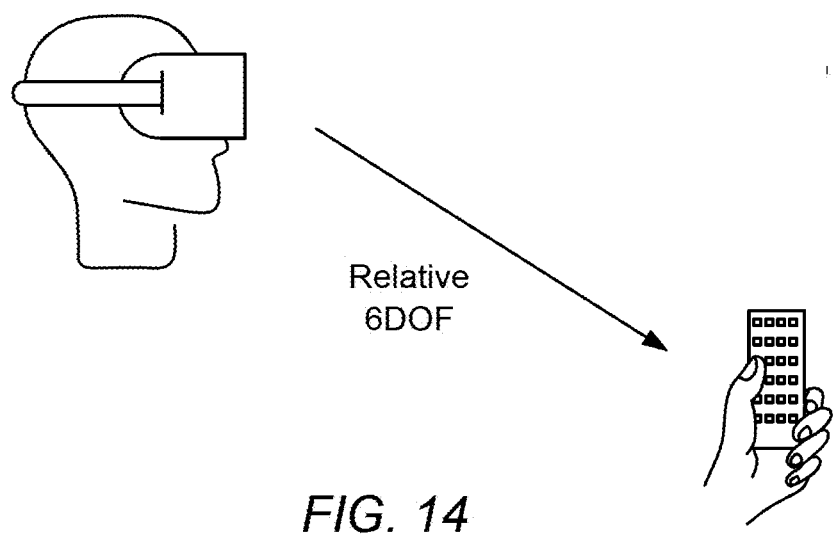
FIG. 14 shows aspects of tracking an input device relative to a position of an HND, according to certain embodiments.

In certain embodiments, two or more tracking systems may be used together, as described above with respect to FIGS. 6 and 9. For example, a first system may track the a position of an HMD and a second system can track a position of a controller with respect to the HMD, as shown in FIG. 14.

There may be some challenges associated with such a fused system as disclosed herein regarding unknown or known inaccuracies, report rates, or latencies between tracking systems. For instance, positional errors in the determination of a position of an HMD using the HMD's tracking system can propagate to the determination of the position of a controller using a controller's tracking system.

Certain implementations may be used to overcome these potential deficiencies. For instance, a prediction of an HMD position (e.g., a corrected HMD position) can be made by the controller tracking system using, for example, a position of the HMD provided by the HMD's tracking system. The HMD location and orientation can be measured and/or estimated by the HMD tracking system. These measurements can be made available via a software interface to an application developer or for integration into a secondary tracking system, such as the controller tracking system. If movements of the HMD are, for example, limited to low accelerations and constant speeds (e.g., linear and angular), the position and orientation of the HMD could be estimated by a controller tracking system using extrapolation that may provide for extrapolation of a higher reporting rate or to account for latencies of the HMD tracking system, for example. By way of illustration, if the controller system knows where the HMD was 50 ms ago (orientation and position) and if it has an estimate of the HMD speed, it can assume that the speed is constant and guess where the HMD is now. For instance, a current position=previous position+speed*delta time (50 ms in this example).

In certain embodiments, an additional IMU can be installed on the HMD to overcome challenges of timing inaccuracies between HMD and controller tracking systems. The additional IMU on the HMD can be used, by the controller tracking system, to track the HMD by fusing the IMU data with position provided by the HMD tracking system, or by using the IMU dta instead of the HMD tracking system providing position information. In this case, the IMU can provide an improved prediction of an HMD's position and orientation with improved accuracy when needed (e.g., when a user's head is moving while the user simultaneously moves a controller device, such as a hand-held 3-DOF or 6-DOF controller) or by providing a sensor data with known latencies, reporting rates, and/or accuracies. Some aspects of this are further described above, at least with respect to FIGS. 6 and 9.

By way of example, suppose that the position of the HMD is refreshed 100 times per second, and each measurement has a latency of 50 ms. An IMU placed on the HMD can provide position and orientation 1000 times per second with a latency close to 1 ms. To compute the current position of the HMD, the controller system may start from the latest absolute position provided by the HMD system. It can estimate the current HMD position based on the IMU data every ms. Each time the HMD system provides a new absolute position, this data can be fused with the IMU data to cancel its drift. In the end, the controller system can get the absolute position of the HMD 1000 times per second, with a latency close to 1 ms.

In further embodiments, an additional IMU placed in the HMD may be used for estimating unwanted delays in reported HMD measurements. The delays of reporting the HMD's position and orientation may be unknown and varying. When fused with the controller position estimates, these measurements can, for example, be time stamped to determine delays or otherwise characterized to determine the IMU's latencies. The trajectory estimated in conjunction with the IMU can be used to estimate the delay. In some cases, when the fusion module receives the HMD's position and orientation data, it can correlate it with IMU data to find the latency of the reported data by the HMD tracking system. Then, the HMD's position and orientation can be extrapolated with the IMU data to find the actual position and orientation of the HMD.

Ultrasonic Sensing

Ultrasonic sensors are based on measuring the properties of sound waves with frequency above a human audible range. They typically operate by generating a high-frequency pulse of sound, and then receiving and evaluating the properties of the pulse. They are typically based on three physical principles: time of flight, the Doppler effect, and the attenuation of sound waves. Ultrasonic sensors are non-intrusive in that they do not require physical contact with their target, and can detect certain clear or shiny targets otherwise obscured to some vision-based sensors. Their measurements can be sensitive to temperature and to the angle of the target.

In ultrasonic sensing, there are typically three different properties of the received echo pulse that may be evaluated for different sensing purposes. They can include: (1) Time-of-flight (for sensing distance); (2) Doppler shift (for sensing velocity); (3) Amplitude attenuation (for sensing distance, directionality, or attenuation coefficient). For time-of-flight (TOF), an ultrasonic transmitter emits a short burst of sound in a particular direction. The pulse is detected by a receiver after a time interval t. The receiver records the length of this time interval, and calculates the distance travelled r based on the c, the speed of sound, as shown for example in equation (1) below:

$$r = c*t \qquad (1)$$

Using proper coordination, a single transducer can be used for both emitting and receiving a pulse. Note that it may take time for the transducer to change modes, which can present a challenge to short-distance measurements.

In a direct measurement mode, the transmitter and receiver may be two separate units that move relative to each other. For instance, the receiver can be fixed to a target that moves relative to a stationary transmitter, or vice-versa. Multiple transmitters can be used to increase the directionality of the transmitted pulse. For example, the pulse may be received by multiple receivers in the performance space, enabling a computer program to triangulate the performer's position.

With Doppler shift, a wave may reflect off of a moving object and its frequency may be shifted by an amount proportional to the velocity of the object. To detect this using ultrasonic sensing, a receiver may not measure the time-of-flight, but the frequency of the returning echo pulse. Knowing fe and fr, the frequency of the emitted and received pulse, respectively, the velocity v of the target may be calculated by the equation (2) below, where A is the angle between the target's and the pulse's lines of motion:

$$fe - fr = 2fe(v/c)\cos(A)^4 \qquad (2)$$

Ultrasonic sound typically attenuates faster than audible sound when propagating through air. By measuring the intensity of the returning pulse, an estimate of the distance travelled can be made (e.g., $I=I0e^{-ax^5}$; where I and I0 are the received and the original intensities, respectively, and where a is the attenuation coefficient (a property of the medium) and x is the distance travelled by the wave). Attenuation may also be caused by an increased angle between the target and receiver, which may even deflect the echo somewhere else and not be heard at all.

Time-of-flight-based sensing typically includes emitting a pulse and waiting for it to return. This waiting time can limit the speed with which successive measurements can be made, without risking confusion. However, Doppler- and attenuation-based sensing devices do not have the same restrictions: a constant wave of ultrasound may be emitted, and the received wave's attenuation or frequency continuously analyzed. This may make measurements speedier, effectively increasing the sensitivity of the sensor.

Ultrasonic sensors provide certain advantages over other types of sensing devices. For example, measurements may be made without touching or otherwise impeding the target, measurements are relative quick (it takes ~6 ms for sound to travel 1 m). However, ultrasonic measurements may be affected by factors such as temperature (also weather and humidity), angle, and material, as they may change the speed of sound in the air.

Ultrasonic Transducers

Ultrasonic transducers are typically divided into three broad categories: transmitters, receivers and transceivers. Transmitters convert electrical signals into ultrasound, receivers convert ultrasound into electrical signals, and transceivers can both transmit and receive ultrasound. Passive ultrasonic sensors can functionally operate as microphones that detect ultrasonic noise that is present under certain conditions.

Systems typically use a transducer which generates sound waves in the ultrasonic range, above 20 kHz, by turning electrical energy into sound, then upon receiving ultrasonic sound waves, turn the sound waves into electrical energy which can be measured. This technology, as well, can detect approaching objects and track their positions.

Ultrasonic transducers can convert AC into ultrasound, as well as the reverse. Ultrasonics typically refers to piezoelectric transducers or capacitive transducers. Piezoelectric crystals change size and shape when a voltage is applied; AC voltage makes them oscillate at the same frequency and produce ultrasonic sound. Capacitive transducers use electrostatic fields between a conductive diaphragm and a backing plate. Since piezoelectric materials generate a voltage when force is applied to them, they can also work as ultrasonic detectors. Some systems use separate transmitters and receivers, while others combine both functions into a single piezoelectric transceiver.

A capacitor ("condenser") microphone has a thin diaphragm that responds to ultrasound waves. Changes in the electric field between the diaphragm and a closely spaced backing plate convert sound signals to electric currents, which can be amplified. The diaphragm (or membrane) principle is also used in the relatively new micro-machined ultrasonic transducers (MUTs). These devices are fabricated using silicon micro-machining technology (MEMS technology), which is particularly useful for the fabrication of transducer arrays. The vibration of the diaphragm may be measured or induced electronically using the capacitance between the diaphragm and a closely spaced backing plate (CMUT), or by adding a thin layer of piezo-electric material on diaphragm (PMUT). Alternatively or additionally, the vibration of the diaphragm may be measured by a tiny optical ring resonator integrated inside the diaphragm.

Embodiments for Improving Accuracy of Ultrasonic-Based Detection of a Controller Systems using ultrasonic transducers can be used to track a location of a controller with respect to a HMD, as further described above. Various techniques may be used to improve the accuracy and/or reliability of such ultrasonic sensor-based systems, including techniques to reduce IMU drift, improve time-of-flight measurements, improve echo detection, and other aspects (e.g., time multiplexing, frequency shift, etc., to improve accuracy). Some of these are further discussed below.

In some embodiments, a controller can be any suitable input device including, but not limited to, a presenter device, a stylus, a computer mouse, a 3D controller (e.g., 3 DOF, 6 DOF controller device), smart phone, smart wearable (e.g., watch, belt, etc.), etc., and the myriad possibilities would be understood by one of ordinary skill in the art with the benefit of this disclosure.

Many contemporary VR systems incorporate HMD tracking with six degrees of freedom (6 DOF). Certain embodiments may incorporate an additional (secondary) tracking system that extends the capability of the base controller (i.e., existing HMD tracking system) such that relative tracking measurements can made with respect to the base controller. This may be useful, for example, for tracking a location and operation of one or more peripheral devices used in conjunction with the HMD, as described above with respect to FIGS. 9-13. The secondary tracking system may use any suitable method of tracking including electromagnetic-based tracking, optical-based tracking, ultrasound-based tracking, IMU-based tracking, or other suitable tracking method.

In the embodiments that follow, the HMD includes an IMU to provide higher resolution position tracking of the HMD and one or more ultrasonic transducers to track a location of a peripheral controller (having microphones). The peripheral controller can be tracked relative to the HMD and the tracked location can be mapped (fused) into the coordinate reference system utilized by the HMD, such that the secondary relative tracking system "piggybacks" on (integrates with) the HMD's base tracking system. It should be mentioned that a notable distinction with respect to conventional VR tracking systems is that conventional systems may use multiple tracking system to track a single entity, such as an IMU and multiple lighthouses to track a location of the HMD in 6 DOF. Embodiments of the invention described herein, in contrast, independently track a peripheral device relative to an existing tracking base station (e.g., HMD) and merge the independently tracked peripheral device into the tracking space (coordinate system) of the HMD.

In some embodiments, there may potentially be multiple sources of delay that can negatively impact a tracking accuracy of a system. The HMD location and orientation can be measured and/or estimated by the HMD tracking system. These measurements could be made available via a software interface to an application developer or for integration into a secondary tracking system, such as the controller tracking system described above. The software interface, as well as the processing time for getting the tracking data, can add delays to the reported data. For example, if a user is moving a tracked 6 DOF stylus relative to an HMD, which in turn may be moving simultaneously, any tracking delay can cause undesirable artifacts (e.g., a perceived "stuttering" or non-continuous tracking of the 6 DOF stylus, HMD, or both). Every error or delay in tracking the HMD and/or peripheral controller can be cumulative and may compound the negative effects on tracking accuracy. Furthermore, many contemporary HMDs report movement at 90 MHz or less, which may be good enough for tracking head movements and corresponding input types, but may not be adequately suited for performance-based tracking of peripheral device configured to interact with and leverage the HMD's reference system. Thus, some embodiments may incorporate an additional higher performance IMU coupled to the HMD that can operate at a much higher frequency, for example, 1000 Hz (e.g., higher tracking sample/reporting rate), to support increased performance parameters that may be associated with the tracked peripheral device. Delays may translate into errors between the reported position and the real position. In a system where a controller is tracked with respect to an HMD, and the HMD is tracked with respect to the room, the errors of both systems can accumulate. Errors on the HMD orientation may have a substantial impact on the error of the controller position, since small angular errors translate into large positional errors at a given distance from the HMD, typically 1 m in practice. In summary, aspects of the invention may comprise a system-agnostic addition to an existing AR/VR base system that may include an additional high performance (e.g., high sample rate) IMU and one or more ultrasonic transducers coupled to a base station (HMD) to adapt to any suitable system in a modular fashion, regardless of the underlying system platform (e.g., inside out, outside in, etc.).

Figure 15:
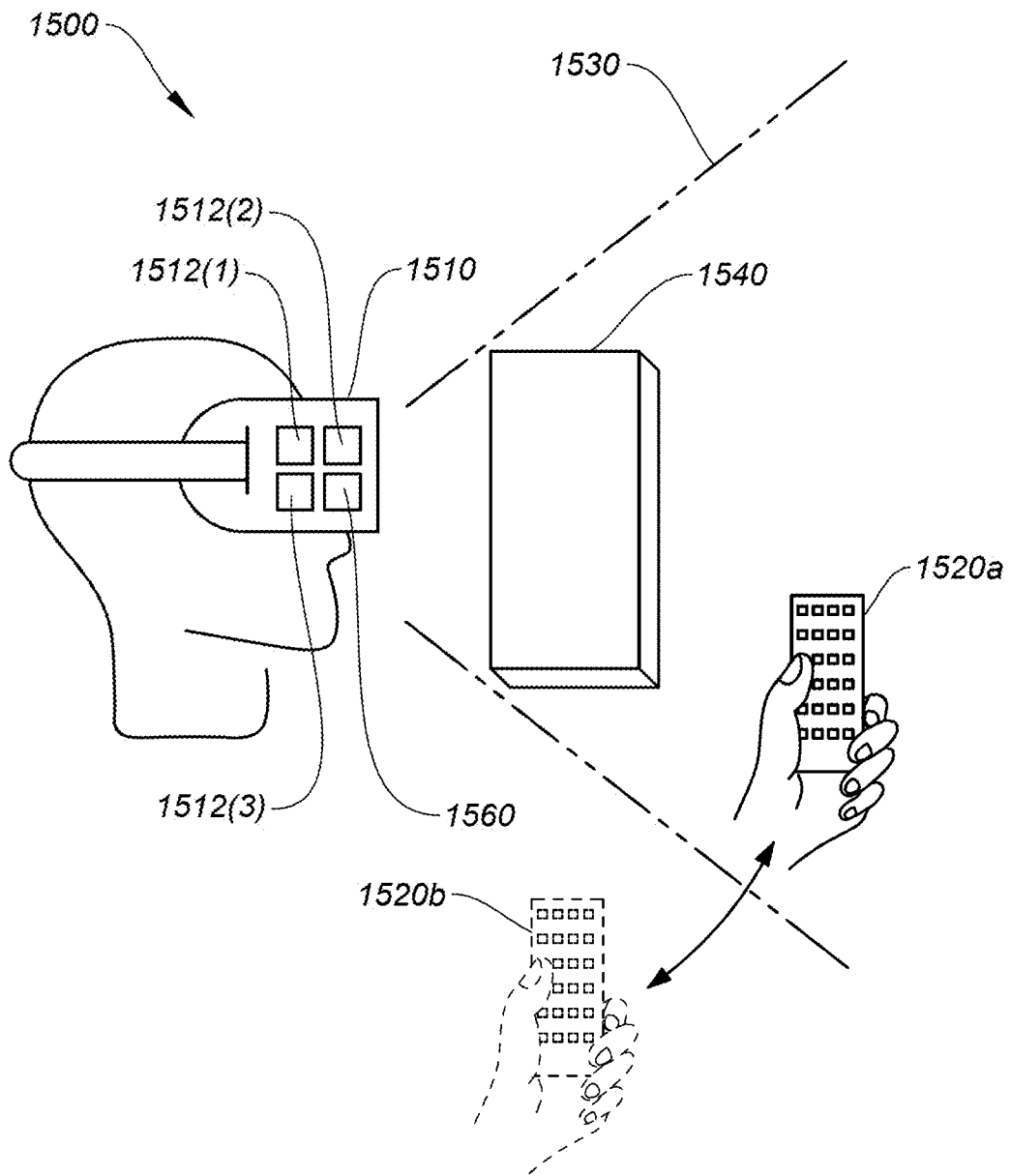
FIG. 15 includes a simplified implementation of an AR/VR system, according to certain embodiments.

FIG. 15 includes a simplified implementation of an AR/VR system 1500, according to certain embodiments. System 1500 includes HMD 1510 and controller device 1520. Controller device 1520(*a*) is shown operating within field-of-view (FOV) 1530, which defines an area visible to the user when viewing an AR/VR world via HMD 1510. Controller device 1520(*b*) shows its operation outside of FOV 1530. HMD 1510 can include one or more transmitters (e.g., transducers) including transducers 1512(1)-1512(3) to transmit RF time-of-flight signals to controller device 1520, and IMU 1560. Controller device 1520 can include one or more microphones (e.g., transducers) configured to receive the TOF signals from HMD 1510. FIGS. 14 and 15 may incorporate aspects of any of the embodiments described above with their corresponding figures (e.g., FIGS. 1, 4, 9, 12-13, etc.) and may be referred to in the following descriptions of the various methods of improving tracking in VR/AR systems.

Reducing IMU Drift

In some embodiments, accelerometer-based IMUs may be subject to an inherent drift due to noise and the error in estimating the orientation. Generally, accelerometer-based IMUs tend to have an increased accuracy when moving, and reduced accuracy (due to drift) when stationary.

In certain embodiments, in an effort to reduce IMU drift, a controller may be configured to operate with a reduced sensitivity (e.g., this may correspond to an amount of movement precision quantified as a "sensitivity value") when the controller is outside of the user's field of view when using an HMD, and an increased sensitivity when the controller is within the user's field of view within the HMD (see, e.g., FIG. 15). Thus, IMU drift associated with the controller can be mitigated by reducing the IMUs corresponding sensitivity when the user is not likely to be interfacing with the controller with any appreciable amount of precision.

Figure 16:
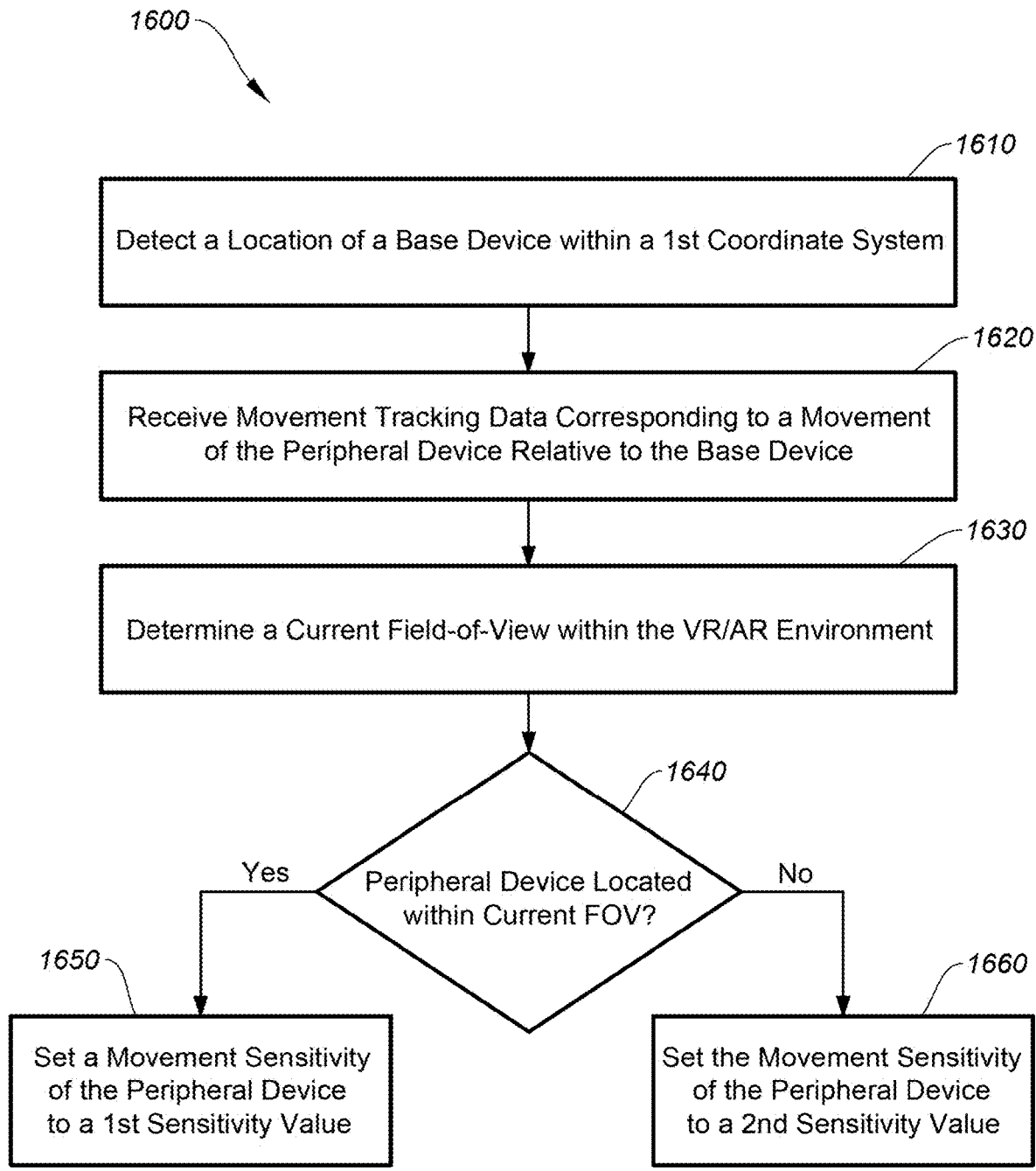
FIG. 16 is a simplified flow chart showing aspects of a method for tracking a peripheral device in an AR/VR environment, according to certain embodiments.

FIG. 16 is a simplified flow chart showing aspects of a method 1600 for tracking a peripheral device in an AR/VR environment, according to certain embodiments. Method 1600 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1600 can be performed by aspects of FIGS. 13-15 (e.g., fusion module 1306).

At operation 1610, method 1600 can include detecting a location of a base device 1510 within a first coordinate system, according to certain embodiments. In some cases, the base device can be HMD 8 or 1510, as shown in FIG. 15. The first and second coordinate system can be Cartesian coordinate systems, polar coordinate systems, cylindrical or spherical coordinate systems, or other coordinate-based systems, as would be appreciated by one of ordinary skill in the art with the benefit of this disclosure.

At operation 1620, method 1600 can include receiving movement tracking data corresponding to a movement of the peripheral device 1520 relative to the base device, according to certain embodiments. In some cases, the movement tracking data (also referred to as location data) can be provided by one or more ultrasonic transducers, optical transducers, laser emitters, IR emitters, or the like. In some cases, the peripheral device may be a controller device (e.g., remote control, joystick, presenter device, wearable device (e.g., smart watch), or the like) that tracks movement in 3 DOF or 6 DOF.

At operation 1630, method 1600 can include determining a current field-of-view 1530 within the VR/AR environment, according to certain embodiments.

At operation 1640, in response to determining that the peripheral device is located within the current field-of-view within the VR/AR environment, method 1600 can include setting a movement sensitivity of the peripheral device to a first sensitivity value, according to certain embodiments. The movement sensitivity may correspond to an amount of tracking resolution associated with the peripheral device. For example, when a user is using the peripheral device to do fine motor control movements and articulations, a high movement sensitivity may be necessary to capture each movement in sufficient detail. Typically, high movement sensitivity may correspond with greater processing requirements (e.g., more power, more processor intensive operations, etc.). On the other hand, if a user is simply holding a peripheral device and not using it for a particular task, or perhaps the peripheral device is not within the user's field of view, then a lower movement sensitivity (i.e., less power and less processor intensive operations) may be appropriate.

At operation 1650, in response to determining that the peripheral device is located outside of the current field-of-view within the VR/AR environment, method 1600 can include setting the movement sensitivity of the peripheral device to a second sensitivity value, the second sensitivity value corresponding to a lower movement sensitivity than the first sensitivity value.

It should be appreciated that the specific steps illustrated in FIG. 1600 provide a particular method 1600 for tracking a peripheral device in an AR/VR environment, according to certain embodiments. Other sequences of steps may also be performed according to alternative embodiments. Furthermore, additional steps may be added or removed depending on the particular applications. For example, enabling or disabling additional systems may be involved with setting a high or low movement sensitivity. Any combination of changes can be used and one of ordinary skill in the art with the benefit of this disclosure would understand the many variations, modifications, and alternative embodiments thereof.

Time-of-Flight Assessment

Accurately tracking a location and movement of a peripheral controller device (e.g., 6 DOF controller with one or more microphones) with respect to an HMD (e.g., with one or more ultrasonic transducers) can largely depend on an accuracy of a corresponding time-of-flight (TOF) measurement between the two entities. The TOF, as applied to certain embodiments, may correspond to the time it takes for an ultrasonic signal originating from a transmitter (e.g., transducer) from the HMD to reach a microphone on the peripheral device, which can correlate to a relative position. In some cases, undesirable effects such as interference, reflections, collisions, unfavorable environmental conditions, and the like, may negatively affect the accuracy of TOF measurements. Furthermore, some methods of TOF assessment may be better suited for periods of movement (e.g., envelope detection) versus periods of non-movement (e.g., correlation detection), as further described below.

In some embodiments, TOF measurements can be dynamically switched between an envelope detection scheme and correlation processing scheme to improve an accuracy of a TOF measurement. In envelope detection, as applied to the embodiments herein, a general shape of a TOF signal envelope and/or a corresponding total amount of power (e.g., with amplitude threshold) can be used to accurately determine a TOF when there is relatively fast movement between the TOF signal source (e.g., HMD) and signal destination (e.g., peripheral controller).

In some cases, correlation processing may be well-suited for tracking small, precision-type movements, or slow movements, as the TOF measurement may involve pattern matching (e.g., comparison between certain signal peaks and valleys) between subsequent TOF signals.

In certain embodiments, both envelope detection and correlation detection may be employed simultaneously. In some cases, each method can be appropriately weighted such that envelope detection may receive more weighting (e.g., relative influence on the TOF calculation) during periods of detected movement greater than a threshold speed (e.g., >10 cm/s) and correlation detection may receive more weighting during detected periods of movement less than the threshold speed. Any suitable weighting algorithm may be employed, as would be understood by one of ordinary skill in the art with the benefit of this disclosure.

In some embodiments, a determination of a confidence (e.g., quality) assessment of each received position measurement can be made. The assessment can be determined based on several evaluation techniques (e.g., envelope detection, SNR, local minima/maxima comparisons, time domain and/or frequency domain cross correlation/autocorrelation, echo detection, collision detections, pulse coding, correlation peak analysis, etc.), where each technique can include certain advantages or weaknesses over other techniques. Once the confidence assessment is determined, a weighting can be assigned based on the quality assessment and/or certain measurements can be used as a primary reference or discarded accordingly.

In some embodiments, envelope detection methods (used in a confidence assessment) may use the rectified (e.g., AM demodulated) signal. After AM demodulation, the carrier frequency and phase information may be lost. Envelope detection may be advantageous due to its simplicity and not being sensitive to Doppler frequency shift. However, envelope detection schemes are vulnerable to perturbations, no immunity to noise, and low accuracy. Thus, envelope detection can be used as a rough ToF estimation, however it may be unusable for pseudo-random type signals (i.e., noise).

In some embodiments, local minima/maxima may be implemented in a confidence assessment, as indicated above. Extremum analysis can be used on harmonic signals (e.g., single tone ultrasound bursts). Some advantages may include being able to use the phase and frequency information of the ultrasound signal, although local minima/maxima signals are not generally applicable for pseudo-random types of ultrasound signals. Extremum analysis can be applied to discriminate the peak of the cross/autocorrelation function.

Time-domain cross-correlation/autocorrelation may be used in a confidence assessment and includes a precise signal/pattern matching technique to discriminate the transmitted signal. Time-domain cross-correlation/autocorrelation can be very precise (time resolution), but may be affected by Doppler frequency shift and echoes.

Frequency-domain cross-correlation/autocorrelation may be used in a confidence assessment and can be very precise. When combined with an adaptive filter, a partial analysis of the operating frequency band can be performed, which may be useful in a presence of a strong perturbator in the operating frequency band. In some cases, it be combined with a channel estimator/equalizer, based on the impulse response of the transmission channel and transducers/microphones to improve the correlation precision. Frequency-domain cross-correlation can allow simultaneous operation in multiple bands (e.g., agility/multiple ecosystems coexistence). The doppler shift can be "tracked" (analyzed and compensated). In some cases frequency domain cross-correlation may be detrimentally affected by echoes and Doppler shift, but to a lesser extent than time-domain cross-correlation.

Pulse coding is a technique to improve signal discrimination and noise cancellation by generating a unique modulation symbol pattern with strong autocorrelation properties. Pulse coding can improve noise immunity and selectivity, but may be perturbed by echoes.

Signal-to-noise (SNR) analysis/correlation can be used to perform peak analysis. An SNR of the received ultrasound signal can be analyzed in order to assess the receive conditions of a given channel and provide the ToF quality estimation. This can also be applied to correlation peak analysis.

A subset of the above confidence assessment techniques can be used all together at the same time to measure the ToF with the "quality" factor. The most appropriate measure then can be used by the sensor fusion module.

Echo Detection, Avoidance, Constructive Use, and Disambiguation

Echoes can be problematic in ultrasonic transducer-based tracking systems and may introduce error in time-of-flight calculations. For example, a signal (e.g., audio wave) received at a peripheral device (e.g., 6 DOF controller device) may have been received as a direct line-of-sight signal from a signal source (e.g., ultrasonic transducers mounted on an HMD), or after one or more reflections (e.g., echoes) from a surrounding environment when the direct line-of-sight signal cannot be detected due to an occlusion (see, e.g., FIG. 14). This uncertainty can have deleterious effects on the accuracy of a tracked peripheral device.

In some cases, however, echoes can be used to improve tracking conditions when the path of the reflections can be modeled and accounted for in TOF calculations. For example, a VR/AR system with an HMD and tracked peripheral device may operate within a particular room (e.g., fully or partially enclosed area). The room can be initially mapped prior to use, or mapped over time to determine a receiving window for various reflections caused by room features (e.g., walls, objects, the floor, the ceiling, etc.). When expected echoes are mapped and can be reliably predicted, controller tracking can maintain a high level of precision, even where there may be occlusions.

For example, in some systems a TOF between transducers on an HMD and microphones on a controller are measured. If something blocks the line-of-sight (e.g., an occlusion), then it can be difficult to attain an accurate TOF estimate. However, if there are reflections bouncing off of the ceiling, walls, or other objects that were previously mapped to estimate their relative distance to the HMD and/or controller, the system can use those mapped reflections to estimate TOF. In some embodiments, if you have both line-of-site (e.g., a direct signal from a transducer) and an echo reflected from a mapped location, TOF estimations can be determined with greater precision. For example, movements made by the HMD and/or controller during a TOF measurements may be better accounted for when multiple TOF signals are received as the delays between the TOF signals can inform how the HMD or controller is moving when the delays are known. In some embodiments, mapping can be performed in real-time, or as a background process that iteratively improves environment mapping over time (e.g., via machine learning).

In certain embodiments, the use of pulse whitening may be used to minimize a transmit pulse length and thus possibly avoid an echo overlap. The technique of pulse whitening may include increasing a bandwidth of a transducer by increasing an attenuation of high power frequencies, which can reduce an overall power of the signal, and amplifying frequencies that are already relatively strongly attenuated, which has the overall effect of "flattening out" the frequency response of the pulse. In some cases, a primary consequence of pulse whitening is a shorter transmit pattern. Shorter transmissions can have benefits including avoiding echo overlap and reducing the effect of Doppler shift.

The pulse whitening technique allows for a very efficient use of the operating frequency band. It is normally applicable to wide-band ultrasound transmissions. The operating ultrasound frequency band is often determined by the physical properties of the transducer/microphone (e.g. sensitivity). In order to use the whole spectrum of frequencies within the operating ultrasound band and maximize the SNR at the receiving end of the system, the pulse whitening may be applied.

Ultrasound transducers and microphones often do not have a "flat" frequency response characteristic. In order to "flatten out" the transmitted signal and compensate for a "not flat" transducer frequency response, the "flattening" compensation is applied at the transmission end of the system at the pulse whitening stage. Pulse whitening can improve noise immunity (selectivity) and optimize (reduce) the length of the pulse by indirectly applying echo cancellation, as would be understood by one of ordinary skill in the art with the benefit of this disclosure.

In further embodiments, dynamically switching between transmitters (e.g., transceivers mounted on an HMD) and/or microphones (e.g., mounted on a controller device) can facilitate the avoidance of echo overlap between received signals. For example, if there is significant echo overlap received on a controller device when the HMD/controller relationship is configured in a particular way, a different transducer positioned at a different location on the HMD may be used to change the distance or orientation between the source (e.g., adjacent transducer) and the destination (e.g., controller device) to help avoid the echo overlap condition. Echo overlap typically occurs when a microphone receives both a line-of-site signal and one or more echoes that are received at a time after the line-of-site signal less than the inverse of the bandwidth of the particular signal, which can significantly degrade the precision of a TOF measurement.

The transducer and/or microphone switching can be a dynamic process. For instance, an echo-mapped environment and/or echo history can be used to switch from a first transducer to a second transducer when a detected position of the HMD relative to the controller tends to result in greater measurement inaccuracies (e.g., due to echo overlapping) when using the first transducer as compared to the second. In some embodiments, multiple transducers and/or microphones may be alternatively selected for use to avoid echo overlapping conditions. Alternatively or additionally, firing patterns can be changed to achieve the same result (e.g., reduced echo overlapping occurrences).

Echo overlap may be detected in a number of different ways. For example, a complex envelope and corresponding phase can be matched for coherency. If coherent, the TOF estimate is more likely to be correct. If incoherent, then an echo overlapping condition may be present.

In certain embodiments, position information can be encoded within each ultrasonic transmission to locate the source and identify echoes. Each transmitter (e.g., transceiver) can be assigned a unique code such that line-of-sight signals and echoes can be tracked more precisely. In some cases, the coding may be provided once (e.g., during a first session, a first hour of use, etc.), with each transmission, or provided via a lookup table such that the position of the transducer does not have to be encoded in the corresponding transmission—only a smaller bandwidth "signature," as would be understood by one of ordinary skill in the art. In an echo overlap condition (e.g., line-of-sight signal and an echo signal sufficiently close in time), knowing the origin of each signal can help to effectively filter the TOF data, particularly when the signals in the overlap condition are from different transmission sources.

The use of coded transmission signals can further help distinguish between multiple controller devices, multiple HMDs, and/or multiple systems. Further, some systems may employ cross-tracking capabilities such that a controller may be tracking from two separate HMDs, which can be helpful where occlusion may be present from one HMD but not the other. One of ordinary skill in the art with the benefit of this disclosure would understand the many variations, modifications, and alternative embodiments thereof.

In some embodiments, ultrasonic signals may be sent from multiple physically distinct transmitters (e.g., from an HMD or light-house type or point-to-point transmitters) to multiple distinct receivers (e.g., on an input device, such as a 6-DOF controller), where for instance the transmitter and receiver topology are precisely known. The channels between each transmitter and each receiver can include numerous echoes with sometimes minimal attenuation due to reflective surfaces (e.g., mirrors, tile, non-sound-absorbent materials, etc.). In such cases, the direct path may not necessarily be the strongest path due to transducer directivity. Also, the signals can be based on periodic codes that have a period that can be shorter than the maximum echo delay. Thus, for each code that is transmitted on each microphone, you may receive a set of estimates of time-of-flight with associated amplitudes. In such an arrangement, the AR/VR tracking system should identify in each receiver which of the received signals from each transmitter are from a direct line-of-sight and which are echoes, or "disambiguate" these signals.

In some embodiments, Euclidean Distance Matrices (EDMs) can be used to implement echo disambiguation techniques. EDMs are further described a white paper titled "*Euclidean Distance Matrices: A Short Walk Through Theory, Algorithms and Applications*" by Ivan Dokmanic, Reza Parhiskar, Juri Ranieri, and Martin Vetterli, the entire contents of which are herein incorporated by reference in its entirety for all purposes. In short, an EDM can be a matrix of squared Euclidean distances between points in a set. For example an N×N EDM can represent the squared distances between four points in space. In consequence, the matrix can be symmetric and the diagonal can be zero-valued. EDM's can have certain properties that may be a consequence of physical geometry (e.g., 3D space). Thus, properties of EDMs allow them to be used in a novel way to collect distance estimates into sets that correspond to physically feasible distances. One of these sets can be the set of line-of-sight distances, but there may be other feasible sets that can correspond to what is sometimes referred to "virtual sources," which can be the transmitters as seen via a reflective surface. Sets that correspond to a single reflection (or an odd number of reflections) may be distinguishable from the line-of-sight set due to the resulting reflection in the corresponding topology. For example, if there are four transmitters arranged as the vertices of a pyramid ABCD, then the reflection could have the same transmitters arranged as A-C-B-D. Note that identification of virtual sources can allow the estimation of the position of reflective surfaces in the room. With this knowledge it is possible to estimate the location based solely on these virtual sources even if the direct paths are occluded. This EDM technique can operate to eliminate echoes due to prior code transmissions (e.g., due to maximum echo delay being potentially greater than the code duration) and also incomplete sets of echoes.

In a scenario where transmitters fire sequentially (e.g., in a TDM scheme or "round robin" fashion, then (potentially multiple) estimates of the times-of-flight (and therefore distances) between a single transmitter and multiple receivers can be obtained. In such cases, an EDM-based system can use the distances between the transmitter and each receiver, as well as the distances between each of the receivers. If the estimates of distance are correct, then the EDM will have the theoretically required properties. Note that depending on the position and size of reflective surfaces, it is possible for each of these surfaces to create a "virtual source" for each of the transmitters. The matrix constructed from each of the squared distances to each of these virtual sources and the squared distances between receivers can also be a valid EDM. In the general case, it may be difficult to distinguish between the original source and the virtual source.

In a scenario where the transmitters fire simultaneously (e.g., in a CDM scheme), choosing codes intelligently allows for simultaneous transmission from each transmitter. An advantage in this context is that distance estimates from all transmitters can be obtained simultaneously, and therefore all of these measurements in the same tentative EDM may be included. In this way, the EDM approach can eliminate many more echoes.

Aspects of the implementation of EDM can rely on the use of a metric that embodies the "distance" between a matrix and the "closest" valid EDM. For instance, if a set of distances corresponds to a physically feasible set of distances, then the corresponding metric may be close to zero. In some cases, all permutations of the possible distances can be used to create a large number of possible sets, to evaluate the metric for each set, and then select the set (or sets) with the smallest metric. In a typical setting, the total number of sets is often relatively small, particularly where certain heuristics are used to eliminate sets that are unlikely to be feasible. For instance, sets where the maximum difference between distances exceeds the maximum distances between transmitters and/or receivers. Further optimization can be realized by applying the algorithm iteratively based on the knowledge of the device location in the prior step. For example, it may be assumed that at 250 Hz, and a maximum speed (e.g., of the input device) of 10 m/s, the distances will likely not change by more than 4 cm from one update to the next. This technique can also be used to iteratively correct estimates of speed-of-sound. In applications involving continuous tracking and location estimation using incomplete TOF data sets, the method described above can be used but with sets that include permutations of a smaller number of transmitters. For example, if the input device has four transmitters, sets with any three transmitters may be included. However, this may result in a substantial increase in the number of sets to be tested.

Adaptive Firing Patterns Using TDM/FDM

In some systems, ultrasonic transducers can be fired simultaneously or in a time-cascaded implementation, typically referred to as time multiplexing. In some embodiments, calculating a position and/or orientation of peripheral device (e.g., 6 DOF controller) may take into account a time of emission for each ultrasound wave when using a time multiplexed-based firing. In some cases, different firing patterns may be employed for better results (e.g., minimized acoustic collisions). For instance, a first order of fired transducers (e.g., ABC) may be fired in succession in a certain operating environment (e.g., a particular room with certain acoustic characteristics), followed by a second order of fired transducers (e.g., BCA) when the operating environment changes and causes increased inducement of error (e.g., increased echoes, collisions, etc.) in received position measurement data.

Alternatively or additionally, some embodiments may employ frequency division multiplexing for the simultaneous firing of ultrasonic transducers, particularly when fast motions are detected and/or an increased number of undesirable effects (echoes, collisions, etc.) are detected.

Thus, certain embodiments may adaptively change firing patterns (e.g., when in TDM mode) and/or adaptive change the encoding technique (e.g., TDM vs. FDM), based on the detected environment. In some cases, both TDM and FDM may be employed simultaneously.

Typically, TDM (Time Division Multiplexing) is preferably used when the operating ultrasound frequency band does not allow the simultaneous allocation of two or more sub-channels. In TDM mode, ultrasound transducers fire sequentially one after another. One advantage is that the whole frequency band can be allocated to one transducer, making for a more robust system. However, TDM may reduce the polling rate at which all the transducer ToF can be measured.

In some cases, FDM (Frequency Division Multiplexing) may be used if the operating ultrasound frequency band allows the simultaneous allocation of two or more sub-channels from different transducers (emitters). FDM advantages can include allowing for an increased polling rate at which all the transducer ToFs will be measured. FDM disadvantages are that FDM are subject to Doppler shifts (e.g., if the velocity vectors of the firing transducers have opposite directions (they are collinear), than due to the Doppler shift the occupied sub-bands could potentially clash if there is no sufficient frequency separation provided. That is, transducer frequency sub-bands may need to be separated by the guard frequency band (where no transmission occurs).

In some embodiments, the ultrasound tracking system can have an adaptability technique that, when the signal detection conditions are permissive (e.g., frequency band is not polluted, SNR is strong, correlation peak is strong), the system can switch to the FDM mode to provide a higher report rate by firing multiple transducers simultaneously. On the other hand, when successful signal detection is difficult (e.g., strong perturbation within the frequency band, low SNR, weak correlation peak, etc.), the system can switch to a more robust TDM mode providing a lower report rate, but still maintaining tracking integrity.

Typically, TDM is not ideal to track moving controllers because TOF measurement are made at different moments in time, i.e., at different controller positions. It is then difficult to combine all measurements to compute the position and orientation of the controller. FDM can be a better solution to track moving controllers because transducers can be fired at the same time. If the controller has many transducers, full FDM may not be possible due to bandwidth limitations in certain systems. The solution might be a combination of TDM and FDM. It may be advantageous to switch to FDM when high speed movements are detected and switch back to TDM when the controller is almost static or when in a noisy environment.

Measuring Frequency Shift to Improve Controller Tracking

Contemporary peripheral device tracking systems operating within a 3D VR environment may be subject to tracking inaccuracies as the peripheral device (e.g., controller device, 6 DOF controller, etc.) may be moving as its relative position from a source (e.g., HMD) is measured. These inaccuracies may manifest as a frequency shift (i.e., phase shift), which can result in drift and/or erratic, low resolution peripheral tracking.

In such cases, Doppler techniques can be used to determine a velocity of a tracked peripheral device relative to the source, which can then be used to account for the movement of the peripheral device and facilitate improved relative position tracking for the peripheral device. Thus, certain embodiments can incorporate an estimated frequency shift and speed of a peripheral device for improved peripheral tracking accuracy, in addition to the various methods of accounting for echo and delay, as further described above.

In another example, an ultrasonic transducer mounted on an HMD may send an ultrasonic signal to a peripheral device, which then receives a returned signal from the peripheral device indicating its relative position. However, a user may have moved the HMD (e.g., during a fast head movement) during the round trip of the peripheral device position data acquisition, which can result in a phase shift in the measurement(s). Thus, phase shifts can be caused by movements of the peripheral device, movements of the HMD, or both. In each case, a movement can be estimated via an IMU measurement, which can then be filtered and/or adjusted to account for the determined phase shift measured via the Doppler techniques described above. In certain embodiments, determine Doppler shifts of received ultrasonic pulses can be used to determine a velocity of a tracked object or, in the alternative, a velocity of a tracked object can be determined via an IMU or other tracking technique to estimate a doppler shift that should be imparted to received or emitted ultrasonic waves. Using this information, a more accurate position determination can be determined.

In some cases where a received signal is an echo (e.g., due to occlusions), it may not be possible to determine a velocity (using Doppler techniques) based on a frequency shift, as the distance travelled by the reflected signal (the echo) may not be known. In such cases, IMU data or previous trajectory data can be used to estimate what the frequency shift due to movement should be during these periods where direct line-of-sight signals may not be available.

Calibration Techniques

In some cases, there may be differing performance characteristics between ultrasonic transducers in a given system, which may affect the quality and accuracy of certain measurements (e.g., time-of-flight measurements). Differences may be attributable to manufacturing tolerances, component aging, etc., as would be understood by one of ordinary skill in the art. Thus, some systems may be calibrated to account for these differences, which can result in improved measurement accuracy.

One calibration technique includes measuring a transducer response after the particular ultrasonic transducer is induced to vibrate (e.g., via a voltage pulse). This can help to characterize the transducer's operating condition and quantify the effects of corresponding environmental factors (e.g., performance changes due to humidity, temperature, barometric pressure, etc.—all of which can affect transducer performance). Once the transducer(s) are characterized, some embodiments may implement the pulse shaping of ultrasonic signals broadcasted by the transducers (e.g., "tuning" the transducers), which may operate to normalize (account for) these variances in transducer performance.

In a typical operation, an ultrasonic transducer may be continually or periodically driven by an amplifier. In some embodiments, when the transducer is pulsed, the output can be immediately switched from an output circuit (e.g., output amplifier) and coupled to a data acquisition system. The data acquisition (DS) system may operate to measure a voltage generated by the transducer to sense oscillations. By analyzing the decay function, a "quality factor" of the ultrasonic transducer may be assessed. That is, the DS system may examine how many periods the transducer vibrates after the pulse, its latent frequency, how the transducer performance may be affected by environmental conditions, age effects (e.g., if tracked over time), and the like. One of ordinary skill in the art with the benefit of this disclosure would understand the many variations, modifications, and alternative embodiments thereof.

In further embodiments, ultrasonic transducers can be calibrated based on a detected speed of sound, which may be affected by environmental factors (e.g., temperature, humidity, etc.), as indicated above. In a typical operation, at least three microphones (e.g., on a control device—e.g., a 6 DOF controller) are needed to determine its position in 3D space based on an output of a single transducer, as three variables (x,y,z) each corresponding to a dimension in 3D space can be solved for using at least three equations (i.e., the measurements from each microphone). By simultaneously solving these equations (along with an estimated speed of sound), the variables can be determined. A fourth microphone may be used to provide a measurement that can be used to solve for a fourth variable (i.e., the speed of sound). Without the use of the fourth microphone, the measured speed of sound can be compared to a reference measurement (e.g., speed of sound under certain environmental conditions), and the system may calibrate expected time-of-flight measurements to account for any offsets, as would be understood by one of ordinary skill in the art with the benefit of this disclosure.

In some situations where fewer than three measurements are received (e.g., due to occlusions), then all variables x, y, and z may not be solved for. However, a relationships between the variables can be determined that, in conjunction with previous position/trajectory information can be used estimate a current position of a tracked object.

In further embodiments, reflections can be used as additional sources of positional data, as discussed above, even in the absence of line-of-site transducer signals. Thus, a single transducer signal received by a single microphone can provide additional useful data if one or more additional mapped reflections are received. The delay associated with the reflections may be known and can be used to determine a velocity or change in position of the HMD or controller device when the delay changes, such as when the HMD and/or the controller moves during transmission of the TOF signal.

In some embodiments, transducers may be mounted on an HMD with receivers on the controller. In alternative embodiments, transducers are on the controller (peripheral device) and the receivers are on the HMD. Thus, location data can be computed locally in the HMD and not transmitted by the controller, as in the first example.

Synchronization Techniques

In some implementations, a master clock signal (e.g., RF electromagnetic signal) can be used as a common reference to synchronize the various electrical components (e.g., transducers, IMUs, etc.) described herein. The master clock signal can be propagated from any suitable source including a base station, lighthouse, or the like. The master clock signal may be an independent system, and may be broadcasted in a generic and/or agnostic signal format (e.g., protocol) for broad application.

Master clock signals that operate at a relatively high frequency (e.g., >1 GHz) may better facilitate more accurate measurements, precise detections, faster calculations, and the like, however high frequencies tend to be more susceptible to occlusions, echoes, and lower range. Low frequencies tend to be less susceptible to occlusions, echoes, etc., but may be too slow for some contemporary applications. Thus, some embodiments broadcast a reference RF signal of 433 MHz, which tends to have good range (e.g., within 30'—enough for AR/VR applications), supports sufficiently fast operation (e.g., in the nanosecond range), and tends to have acceptably susceptible to echoes, reflections, and occlusions for many applications (including the embodiments discussed herein). Some embodiments may use more clock references—each for a different purpose, and any suitable frequency may be used, as would be understood by one of ordinary skill in the art.

Tracking a Peripheral Device Using a Subset of Point-to-Point Tracking Source Data In some of the embodiments described above, such as the fusion-based system of FIG. 13, a vector of a tracked object (e.g., peripheral device) may be determined using multiple tracking systems including an IMU-based system and a point-to-point tracking system, such as ultrasound or optical-based systems. Typically, IMUs can provide high accuracy estimations for an object's orientation and a comparatively lower accuracy estimation for the object's position due to inherent drift in the measurement. Tracked systems (ultrasound, optical, IR, etc.) can often provide accurate position data. Combining both sets of tracking data (e.g., via fusion module 1306) can provide better tracking accuracy.

In a typical tracking system, at least three transponders (e.g., ultrasound transducers, optical emitters, etc.) are used to track a movement of a peripheral device 1520 (e.g., controller device, input device, 6DOF controller, etc.) in 3D space to provide at least one signal for each dimension (e.g., xyz). In some cases, occlusions may block one or more of the signals from the transponders such that the tracked peripheral device 1520 may not receive the full set of three signals. By way of example, FIG. 15 shows an object shown in a FOV 1530 but obscured by object 1540. In some conventional systems, a subset of the full set of signals (e.g., one or two signals) could not be used to determine a position of the peripheral device (e.g., controller 1200), and would thus be discarded until the next full set of signals arrived. However, aspects of the present invention can utilize the subset of the full set of signals to improve a tracking estimation of a peripheral device. To better illustrate the concepts that follow, references to FIGS. 12-15 are made and any aspect of each embodiment may be incorporated into one another as would be appreciated by one of ordinary skill in the art with the benefit of this disclosure.

In some embodiments, an IMU 1302 may measure an acceleration and velocity (e.g., linear and/or angular) of a peripheral device, which can be used to continuously determine its position and orientation in the AR/VR environment. Position can be tracked, for example, by the double integration of the acceleration, but is prone to error due to drift. Other sensors (e.g., ultrasound, IR, optical, etc.) can provide data (partial or full set of data) that can be used to make corrections to these determinations, as described above.

In certain embodiments, a plurality of sensors (e.g., at least three) may be disposed on the peripheral device (e.g., ultrasound detectors 1232) and the location of each of the plurality of sensors with respect to the location on the peripheral device is known by the system (e.g., peripheral device and/or HMD). That is, the geometry of the peripheral device and the corresponding location of the sensors are mapped and correlated, and using the location of the transponders (e.g., ultrasound speakers on a remote lighthouse or HMD), the position and orientation of the peripheral device may be determined. Typically, tracking may be possible when the system can reliably identify the source of the transmissions (e.g., the ultrasound transponders) and the location of the sensor with respect to the peripheral device. Because each sensor is correlated with a particular location on the peripheral device, the different detected TOFs can inform the orientation of the peripheral device, as would be appreciated by one of ordinary skill in the art with the benefit of this disclosure. Such systems typically have synchronized timing of send and receive patterns (e.g., performed via speakers and microphones, respectively, as described above).

In certain embodiments, a subset of a full set (e.g., one of three) of received signals can be used to track a position and orientation (referred to as "pose") of the peripheral device. When an incomplete or partial set (subset) of signals are received, the pose of the peripheral device may have multiple possible orientations, or states. In some aspects, a Bayes-type filter (e.g., Kalman, extended Kalman, Particle, etc.) can utilize the partial pose information from the tracking system (1304) as a first input and the IMU (1302) input as a second input to produce an improved pose estimation that can be better than the IMU pose estimation alone. For example, with partial information and Kalman filter may be used to compensate for deviation or error (e.g., drift from the IMU) using the partial information and continuously selecting possible detected states to produce an optimal solution that ultimately produce a better pose prediction over time. Note that all tracking system signals may be received most of the time, which along with the IMU estimate, can provide a very accurate pose estimation for the peripheral device. It is during those periods where signals may be occluded for a period of time that the Beyesian filter implementation is typically used to make a best estimate of the pose of the peripheral device when all tracked system signals are not available.

The probabilistic filters described herein generally explicitly recite an extended Kalman filter, but other filter types are possible. To provide some background, a recursive Bayesian estimation (i.e., a Bayes filter) is a general probabilistic method of recursively estimating an unknown probability density function over time using input measurements and a mathematical process model. As applied to AR/VR systems as described in the present disclosure, the input measurements can be a first pose estimation system (e.g., IMU 1302) and a second pose estimation system (e.g., ultrasound tracking system). Bayes filters can be utilized to continuously update the most likely pose of the peripheral device within a coordinate system (e.g., Cartesian, Polar, etc.) based on a most recently acquired sensor data. The most recent sensor data, for example, may correspond to an ultrasound signal broadcast by a single transmitter and received by one or more receivers on the peripheral device (e.g., in a TDM system). The Kalman filter is a Beyesian filter that is well suited for linear dynamical systems with linear measurement models driven by Gaussian distributions (normal distributions) and determines a most probable state as the unbiased linear minimum variance estimate of the system. Some preferred embodiments of the present disclosure may incorporate an extended Kalman filter (EKM) that is an extension of the Kalman filter but can be applied to non-linear systems. Other probabilistic filters may be used (e.g., particle filter) as well. One of ordinary skill in the art with the benefit of this disclosure would understand the many types of probabilistic filters and their applications to the embodiments described herein.

Tracking a pose of a peripheral device using a subset of a complete set of signals may provide additional benefits in time-division-multiplex (TDM)-based systems. TDM systems may typically have at least three transducers (e.g., speakers) and three sensors (e.g., microphones), to track three dimensions of movement in an AR/VR system. Propagation time in ultrasound is not negligible and can ultimately limit the rate at which ultrasound measurements can be made, particularly in TDM-based systems. Typically, a TDM-based AR/VR system may sequentially fire ultrasound transmitters every 5-10 ms, which can provide enough time margin for echoes to dissipate. This can result in a full set of signals from three transducers (for triangulation) to be received at approximately 30 Hz. Thus, waiting for all signals (e.g., three transducers*three sensors=nine signals) cannot occur any faster than 30 Hz, which may be too slow for accurate tracking. However, processing each received signal immediately (e.g., using a signal from a signal transmitter with Kalman filtering as described above) may result in 120 Hz operation or more. This concept applies to other systems as well, such as code division multiplexed (CDM) or frequency division multiplexed (FDM) signals. For instance, CDM systems may receive all signals at the same time, however some received signals may be corrupted or may otherwise be an unusable low quality signal. Instead of waiting for another full set of signals, the remaining signals may be used with the probabilistic methods described above.

Figure 17:
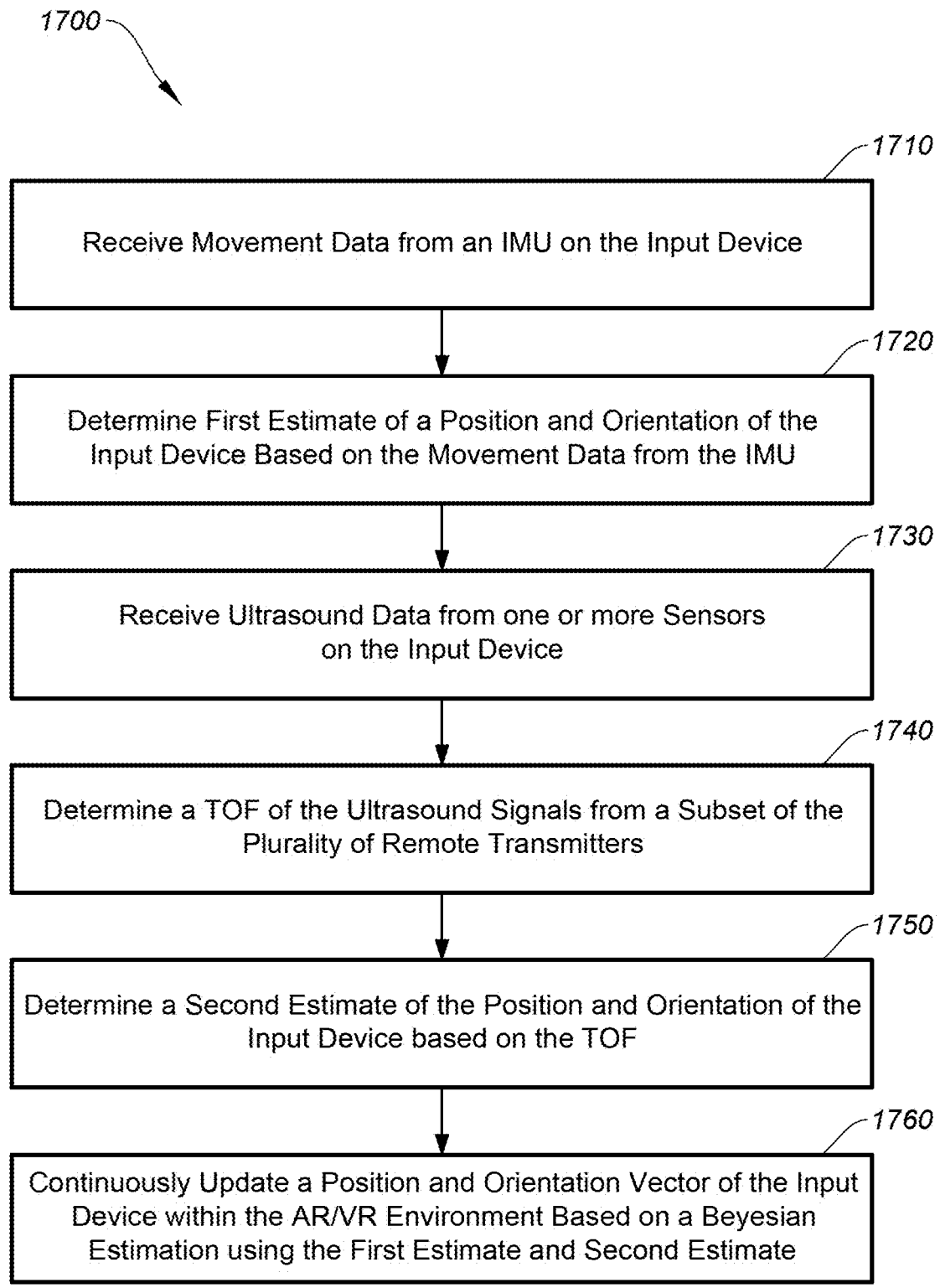
FIG. 17 is a simplified flow chart showing aspects of a method for tracking an input device in an AR/VR environment using a subset of tracking signals, according to certain embodiments.

FIG. 17 is a simplified flow chart showing aspects of a method 1700 for tracking an input device in an AR/VR environment using a subset of tracking signals, according to certain embodiments. Method 1700 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1700 can be performed by aspects of system 1300 of FIG. 13, and may be operated by any suitable computing system having one or more processors and one or more non-transitory computer-readable storage mediums containing instructions configured to cause the one or more processors to perform the foregoing operations.

At operation 1710, method 1700 can include receiving movement data from an IMU 1302 on the input device, according to certain embodiments. For example, movement data can include acceleration data and/or angular velocity data that corresponds to the movement of the IMU coupled to the input device (1520). The IMU may, for example, include one or more accelerometers, gyroscopes, and/or magnetometers to estimate the orientation of the IMU.

At operation 1720, method 1700 can include determining a first estimate of a position and orientation of the input device based on the movement data from the IMU, according to certain embodiments.

At operation 1730, method 1700 can include receiving ultrasound data from one or more sensors (e.g., ultrasound microphones) on the input device, the ultrasound data including ultrasound signals received from a one or more remote emitters (e.g., ultrasound speakers), according to certain embodiments. Although the embodiments described in method 1700 relate to ultrasound based systems, other systems using optical transducers, laser emitters, IR emitters, or the like, may be used. In some cases, the input device (peripheral device) may be a controller device (e.g., remote control, joystick, presenter device, wearable device (e.g., smart watch), or the like) that tracks movement in 3 DOF or 6 DOF. The emitter(s) can be referred to as transmitters and may include transducers.

At operation 1740, method 1700 can include determining a TOF of the ultrasound signals from a subset of the plurality of remote transmitters, according to certain embodiments. For example, in a TDM system, the first received ultrasound signal (the subset) may be processed (i.e., TOF measurement) immediately when received by the one or more sensors before waiting for subsequent signals from the remaining transmitters (the full set). In a CDM system, unusable signals may be discarded and the remaining subset of received ultrasound signals can be used for the TOF measurement. In some cases, the subset of the plurality of the remote transmitters can be less than a total number of the plurality of the remote transmitters. Alternatively or additionally, a subset of the total number of sensors may be used in the TOF calculation (e.g., one or more sensors may be occluded).

At operation 1750, method 1700 can include determining a second estimate of the position and orientation of the input device based on the TOF of the ultrasound signal(s) from the subset of the plurality of remote transmitters, according to certain embodiments. The second estimate may include multiple estimated locations, positions, and/or orientations due to the incomplete set of received ultrasound signals.

At operation 1760, method 1700 can include continuously updating a position and orientation vector of the input device within the AR/VR environment based on a Beyesian estimation utilizing the first estimate and second estimate, according to certain embodiments. In some embodiments, the Beyesian estimation includes the use of at least one of a Kalman-type filter (e.g., extended Kalman) or a particle filter. As indicated above, the ultrasound signals may be propagated according to one of a TDM scheme, FDM scheme, or a CDM scheme. In some cases, the AR/VR environment may be defined by a Cartesian coordinate system, and the input device can be configured to track movement in the AR/VR environment in 6 DOF.

It should be appreciated that the specific operations illustrated in FIG. 17 provide a particular method 1700 for tracking an input device in an AR/VR environment using a subset of tracking signals according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Although some of the embodiments described herein include sensors (e.g., receivers) configured on the peripheral device and transmitters on the HMD or other remote location (e.g., lighthouse type transmitters), some embodiments may have the transmitters on the peripheral device and sensors at an external location (e.g., HMD, lighthouse, etc.). Referring to FIG. 13, for instance, the IMU system may be on the input device and the fusion and tracked system may be located on an external device (e.g., HMD). In some cases, such implementations may include a host device, such as an HMD, with one or more processors and a plurality of sensors disposed thereon to receive emissions from emitters disposed on the peripheral device. The UN/ID could receive IMU data (e.g., acceleration data) from the peripheral device along with the tracking data (ultrasonic emissions) via each of the plurality of sensors configured to detect emissions received from a plurality of remote emitters, and each of the plurality of sensors can be associated by the one or more processors with a different particular location on the HMD. The one or more processors can be configured to: determine a time-of-flight (TOF) of each of the detected emissions; determine a first estimate of a position and orientation of the input device based on the TOF of a subset of the detected emissions and the particular locations of each of the plurality of sensors on the HMD that are detecting the detected emissions; determine a second estimate of the position and orientation of the input device based on the measured acceleration from the IMU data; and continuously update a calculated position and orientation of the input device within the AR/VR environment in real-time based on a Beyesian estimation that utilizes the first estimate and second estimate.

Iterative Joint Detection

In some embodiments, simultaneous ultrasonic signals can be sent from multiple physically distinct transmitters to a single receiver over a bandlimited sparse channel with the purpose of measuring the times-of-flight of each path (direct and echoes) from each transmitter. In some cases, codes can be chosen that have quasi ideal auto-correlation (e.g., m-sequences if applied as cyclical codes), however it can be impossible for a family of codes to have both ideal auto-correlation and ideal cross-correlation (except for complete complementary codes, which use a set of codes for each transmitter, and present additional challenges). Note that as soon as a code is transmitted via a band-limited channel, it is likely to lose its "ideal" (in a strict sense) auto-correlation properties (autocorrelation of 1 at zero offset, 0 elsewhere).

Typically, the detection of a signal with added Gaussian noise may been shown to be optimal when using a matched filter. However, some embodiments utilizing ultrasound-based systems as described above (e.g., see FIGS. 13-17), detection of each path from each transmitter using matched filters may not be optimal because (1) the receive signal may generally contain multiple replicas of code A, and (2) the receive signal may generally also contain replicas of code B. Due to the selection of codes with good autocorrelation properties, point (1) is typically only a problem when paths are closely spaced in time (approximately less than the inverse of the channel bandwidth) and is difficult to resolve. However, point (2) remains and correlation of the received signal with any single code will potentially be perturbed by the presence of the other interfering codes. This is not particularly damaging when the signal of interest is stronger or has similar amplitude to the interfering signal, because the cross-correlation coefficients can be designed to be relatively small. However, it does become a serious issue if the interfering signal is much stronger than the signal of interest.

In order to improve on the non-optimal matched filter, knowledge of all transmitted codes may be used to estimate the channel from each single transmitter. Thus, in some embodiments, a joint sparse channel estimation (also referred to as "compressed sensing") technique may be used. Conventionally, either convex optimization techniques (typically using L1-norm regularization) or so-called "greedy" techniques are used (such as the Matching Pursuit algorithm). Convex optimization can be difficult to achieve mostly because it suffers from performance degradation in the presence of fractional delays. One solution then is significant time-domain oversampling which typically requires excessive computational complexity. Aspects of the invention employ a "greedy" technique (similar to the Matching Pursuit algorithm, but adapted to the multi-code multi-channel situation), which can be a simpler model, and may be based on iteratively estimating and subtracting the strongest remaining code replica in the received signal. The technique therefore may need an underlying method for estimating the precise amplitude and delay when the path is the strongest. Aspects of the invention employ a computationally efficient implementation that relies on optimizing a linear phase slope in the frequency domain (using a fast Fourier transform or FFT). Use of the FFT (which assumes periodic signals) means that this technique is particularly well suited to the case of periodic codes.

According to certain embodiments, one method of iterative estimation and subtractions, as described above, may include: (1) computing amplitudes and delays of strongest path for each code; (2) selecting strongest corresponding code replica; (3) subtracting identically scaled and delayed code; and (4) go to (1) and repeat. Some challenges may be presented in ultrasound signaling when any unknown or unexpected distortion of the transmitted codes occurs. Some preferred embodiments may utilize ultra-wideband ultrasound signaling, where the bandwidth may be significant as compared to the carrier (center) frequency. Some embodiments may use signals in the range of 20-80 kHz or more. In such cases, the impulse response may vary considerably as a function of the relative orientation of transmit (e.g., speakers) and receive (e.g., microphones) transducers. Thus, a successful joint iterative path estimation may involve the creation (perhaps via some calibration) of a model giving the impulse response as a function of the relative orientation. In addition, the system should be able to estimate this relative orientation (which can be done even with coarse delay estimates). With this information the system can subtract an accurate replica of the received code at each step in the algorithm and guarantee a high level of precision. In other aspects, codes are chosen that can be combined with and extracted from the combination of received signals without losing the individual codes with the codes being substantially orthogonal or independent and not correlated.

Figure 18:
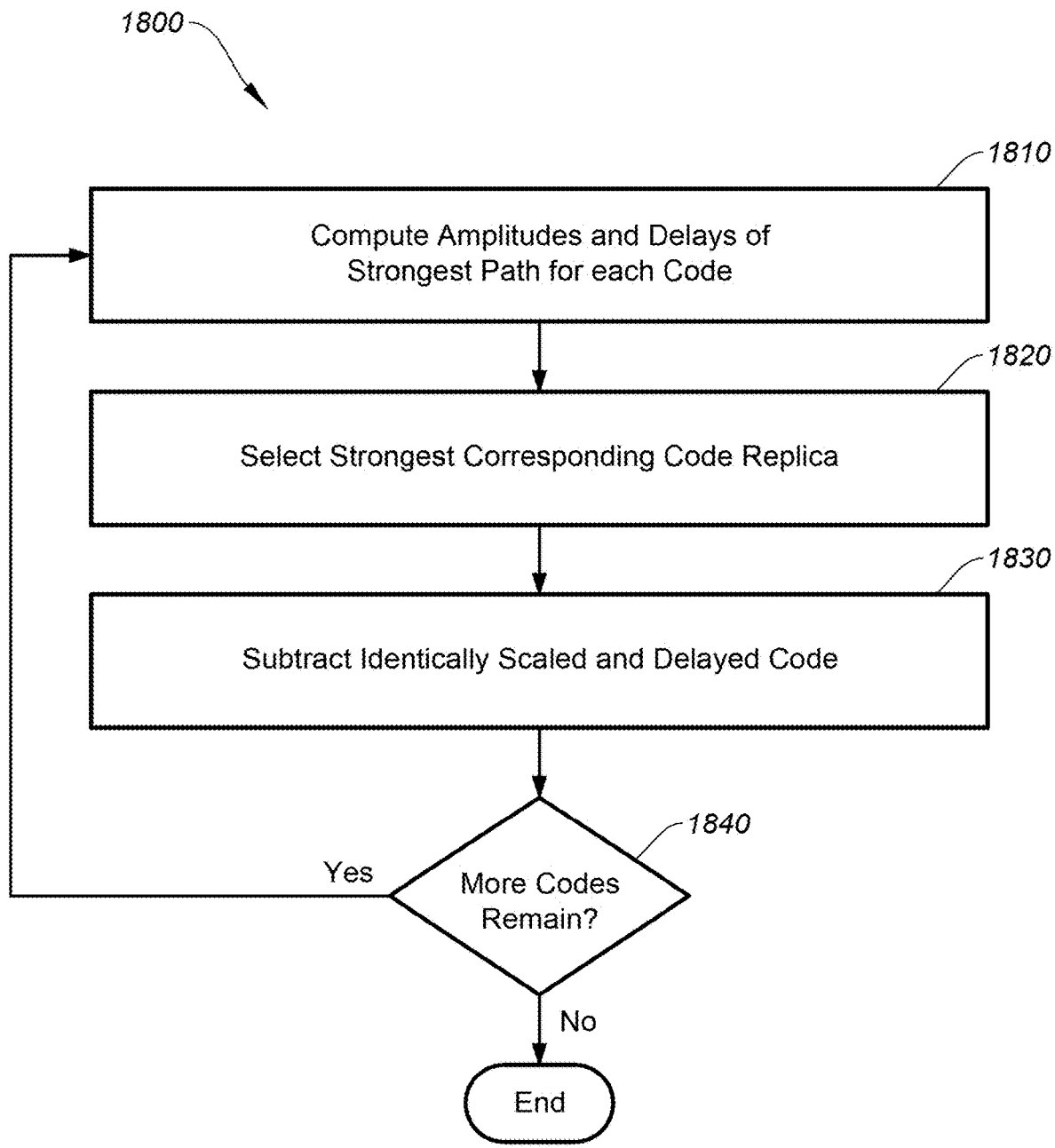
FIG. 18 is a simplified flow chart showing aspects of a method of iterative joint detection, according to certain embodiments.

FIG. 18 is a simplified flow chart showing aspects of a method 1800 of iterative joint detection, according to certain embodiments. Method 1800 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1700 can be performed by aspects of system 1300 of FIG. 13, or any of the other systems described herein or aspects thereof, which may include any computing system having one or more processors and one or more non-transitory computer-readable storage mediums containing instructions configured to cause the one or more processors to perform the foregoing operations.

At operation 1810, method 1800 can include determining amplitudes and/or delays of strongest path for each code.

At operation 1820, method 1800 can include selecting the strongest corresponding code replica.

At operation 1830, method 1800 can include subtracting identically scaled and delayed code.

At operation 1840, if additional codes are present, the method is iterated (operation 1810). If no additional codes are present, the method ends.

It should be appreciated that the specific operation illustrated in FIG. 18 provide a particular method 1800 for iterative joint detection, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

General Computer System Diagram

Figure 19:
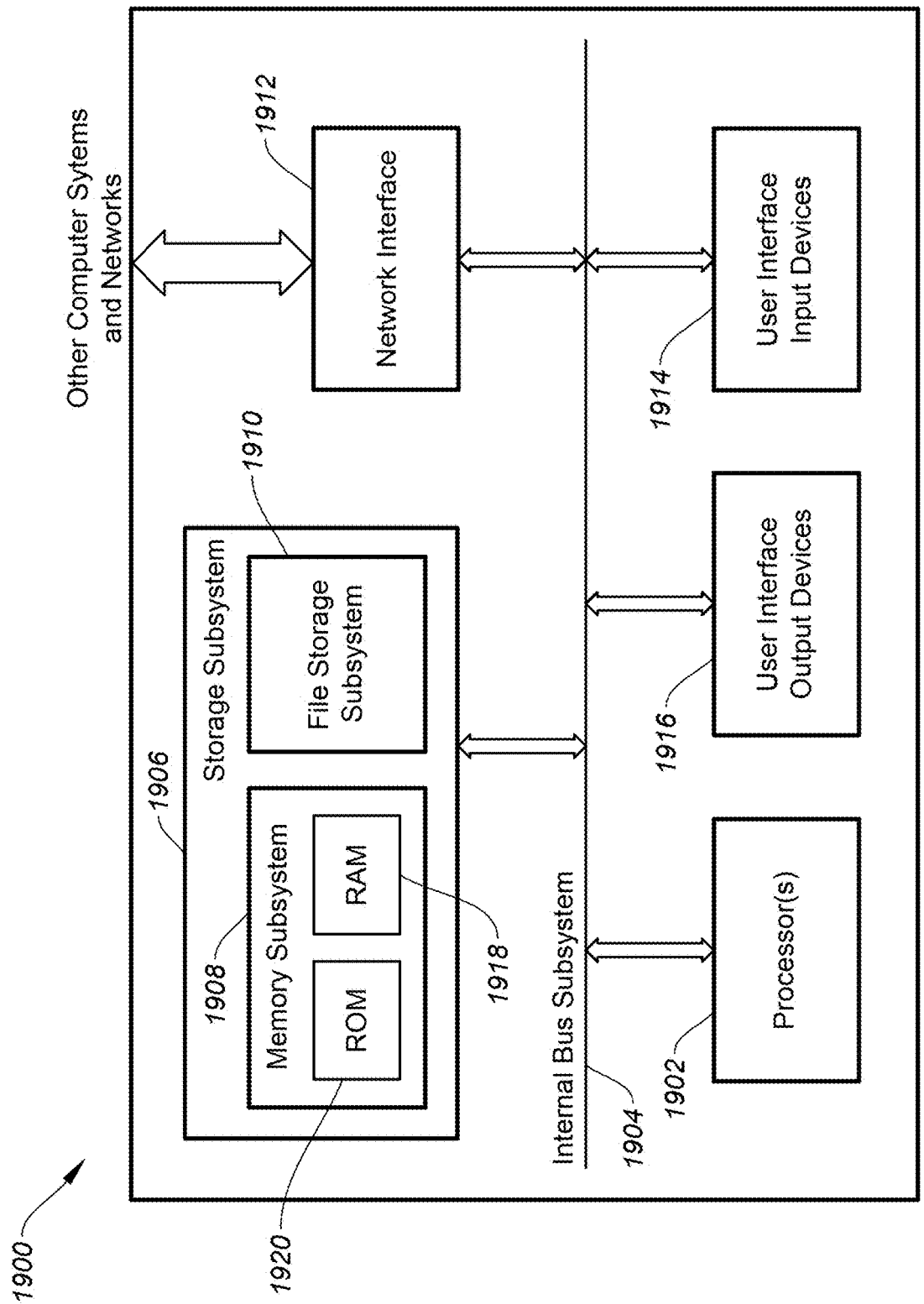
FIG. 19 shows a system for operating aspects of an AR/VR system, according to certain embodiments.

FIG. 19 shows a system 1900 for operating aspects of an AR/VR system, according to certain embodiments. System 1900 can be used to implement any of the host computing devices discussed herein (e.g., host computer 4, HMD 8, any aspect of systems 900, 1300, other device described herein) and the myriad embodiments defined herein or within the purview of this disclosure but not necessarily explicitly described. System 1900 can include one or more processors 1902 that can communicate with a number of peripheral devices (e.g., input devices) via a bus subsystem 1904. These peripheral devices can include storage subsystem 1906 (comprising memory subsystem 1908 and file storage subsystem 1910), user interface input devices 1914, user interface output devices 1916, and network interface subsystem 1912. User input devices 1914 can be any of the input device types described herein (e.g., keyboard, computer mouse, remote control, etc.). User output devices 1916 can be a display of any type, including computer monitors, displays on handheld devices (e.g., smart phones, gaming systems), or the like, as would be understood by one of ordinary skill in the art. Alternatively or additionally, a display may include virtual reality (VR) displays, augmented reality displays, holographic displays, and the like, as would be understood by one of ordinary skill in the art.

In some examples, internal bus subsystem 1904 can provide a mechanism for letting the various components and subsystems of computer system 1900 communicate with each other as intended. Although internal bus subsystem 1904 is shown schematically as a single bus, alternative embodiments of the bus subsystem can utilize multiple buses. Additionally, network interface subsystem 1912 can serve as an interface for communicating data between computer system 1900 and other computer systems or networks. Embodiments of network interface subsystem 1912 can include wired interfaces (e.g., Ethernet, CAN, RS232, RS485, etc.) or wireless interfaces (e.g., Bluetooth®, BLE, ZigBee®, Z-Wire®, Wi-Fi, cellular protocols, etc.).

In some cases, user interface input devices 1914 can include a keyboard, a presenter, a pointing device (e.g., mouse, trackball, touchpad, etc.), a touch-screen incorporated into a display, audio input devices (e.g., voice recognition systems, microphones, etc.), Human Machine Interfaces (HMI) and other types of input devices. In general, use of the term "input device" is intended to include all possible types of devices and mechanisms for inputting information into computer system 1900. Additionally, user interface output devices 1916 can include a display subsystem, a printer, or non-visual displays such as audio output devices, etc. The display subsystem can be any known type of display device. In general, use of the term "output device" is intended to include all possible types of devices and mechanisms for outputting information from computer system 1900.

Storage subsystem 1906 can include memory subsystem 1908 and file storage subsystem 1910. Memory subsystems 1908 and file storage subsystem 1910 represent non-transitory computer-readable storage media that can store program code and/or data that provide the functionality of embodiments of the present disclosure. In some embodiments, memory subsystem 1908 can include a number of memories including main random access memory (RAM) 1918 for storage of instructions and data during program execution and read-only memory (ROM) 1920 in which fixed instructions may be stored. File storage subsystem 1910 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1900 is illustrative and not intended to limit embodiments of the present disclosure. Many other configurations having more or fewer components than system 1900 are possible. The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard or non-standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connections to other computing devices such as network input/output devices may be employed.

It will be appreciated that any of the disclosed methods (or corresponding apparatuses, programs, data carriers, etc.) may be carried out by either a host or client, depending on the specific implementation (i.e., the disclosed methods/apparatuses are a form of communication(s), and as such, may be carried out from either 'point of view', i.e., in corresponding to each other fashion).

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

Unless otherwise explicitly stated as incompatible, or the physics or otherwise of the embodiments, example or claims prevent such a combination, the features of the foregoing embodiments and examples, and of the following claims may be integrated together in any suitable arrangement, especially ones where there is a beneficial effect in doing so. This is not limited to only any specified benefit, and instead may arise from an "ex post facto" benefit. This is to say that the combination of features is not limited by the described forms, particularly the form (e.g., numbering) of the example(s), embodiment(s), or dependency of the claim(s). Moreover, this also applies to the phrase "in one embodiment", "according to an embodiment" and the like, which are merely a stylistic form of wording and are not to be construed as limiting the following features to a separate embodiment to all other instances of the same or similar wording. This is to say, a reference to 'an', 'one' or 'some' embodiment(s) may be a reference to any one or more, and/or all embodiments, or combination(s) thereof, disclosed. Also, similarly, the reference to "the" embodiment may not be limited to the immediately preceding embodiment.

Certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks. Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

For example, any number of computer programming languages, such as C, C++, C# (CSharp), Perl, Ada, Python, Pascal, SmallTalk, FORTRAN, assembly language, and the like, may be used to implement machine instructions. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of function The foregoing description of one or more implementations provides illustration and description, but is not intended to be exhaustive or to limit the scope of the invention to the precise form disclosed. Modifications and variations are possible in light of the above teachings or may be acquired from practice of various implementations of the present disclosure.

What is claimed is:

1. A method of reducing inertial measurement unit (IMU) drift in a peripheral device, the method comprising:
   receiving movement tracking data corresponding to a movement of the peripheral device within a virtual reality/augmented (ARIVR) environment;
   while receiving the movement tracking data corresponding to the movement of the peripheral device:
   determining a current field-of-view within the AR/VR environment;
   in response to determining that the peripheral device is located within the current field-of-view within the AR/VR environment, setting a movement sensitivity of the peripheral device to a first movement sensitivity value; and
   in response to determining that the peripheral device is located outside of the current field-of-view within the AR/VR environment, mitigating IMU drift of the peripheral device by setting the movement sensitivity of the peripheral device to a second movement sensitivity value,
   wherein the movement tracking data corresponds to movement of the peripheral device over 6 degrees of freedom:
   wherein the movement sensitivity corresponds to an amount of position tracking resolution associated with peripheral device, and
   wherein the first movement sensitivity value has a higher position tracking resolution than the second movement sensitivity value, the second movement sensitivity value being a non-zero value.

2. The method of claim 1 wherein the setting of the movement sensitivity of the peripheral device to the first and second sensitivity values corresponds to a same function.

3. The method of claim 1 wherein the peripheral device is a stylus device.

4. A system for reducing tracking drift in a peripheral device, the system comprising:
   one or more processors;
   one or more machine-readable, non-transitory storage mediums that include instructions configured to cause the one or more processors to perform operations including:
   receiving movement tracking data corresponding to a movement of the peripheral device within a virtual reality/augmented (AR/VR) environment;
   while receiving the movement tracking data corresponding to the movement of the peripheral device:
   determining a current field-of-view within the AR/VR environment;
   in response to determining that the peripheral device is located within the current field-of-view within the AR/VR environment, setting a movement sensitivity of the peripheral device to a first movement sensitivity value; and
   in response to determining that the peripheral device is located outside of the current field-of-view within the AR/VR environment, mitigating IMU drift of the peripheral device by setting the movement sensitivity of the peripheral device to a second movement sensitivity value,
   wherein the movement sensitivity corresponds to an amount of position tracking resolution associated with peripheral device, and
   wherein the first movement sensitivity value has a higher position tracking resolution than the second movement sensitivity value, the second movement sensitivity value being a non-zero value.

5. The system of claim 4 wherein the setting of the movement sensitivity of the peripheral device to the first and second sensitivity values corresponds to a same function.

6. The system of claim 4 wherein the peripheral device is a stylus device.

7. A computer-program product tangibly embodied in a machine-readable non-transitory storage medium that includes instructions configured to reducing tracking drift in a peripheral device by causing one or more processors to:
   receive movement tracking data corresponding to a movement of a peripheral device within a virtual reality/augmented (AR/VR) environment;
   while receiving the movement tracking data corresponding to the movement of the peripheral device:
   determine a current field-of-view within the AR/VR environment;
   in response to determining that the peripheral device is located within the current field-of-view within the AR/VR environment, set a movement sensitivity of the peripheral device to a first movement sensitivity value; and
   in response to determining that the peripheral device is located outside of the current field-of-view within the AR/VR environment, mitigate IMU drift of the peripheral device by setting the movement sensitivity of the peripheral device to a second movement sensitivity value,
   wherein the movement sensitivity corresponds to an amount of position tracking resolution associated with peripheral device, and
   wherein the first movement sensitivity value has a higher position tracking resolution than the second movement sensitivity value, the second movement sensitivity value being a non-zero value.

8. The computer-program product of claim 7 wherein the setting of the movement sensitivity of the peripheral device to the first and second sensitivity values corresponds to a same function.

* * * * *